(12) United States Patent
Horn et al.

(10) Patent No.: US 11,706,779 B2
(45) Date of Patent: Jul. 18, 2023

(54) MODULATED PREAMBLE FOR LOW POWER OPERATIONS

(71) Applicant: QUALCOMM Incorporated, San Diego, CA (US)

(72) Inventors: Idan Michael Horn, Hod Hasharon (IL); Gideon Shlomo Kutz, Ramat Hasharon (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/336,018

(22) Filed: Jun. 1, 2021

(65) Prior Publication Data
US 2022/0386280 A1    Dec. 1, 2022

(51) Int. Cl.
*H04W 24/08*    (2009.01)
*H04W 72/23*    (2023.01)
*H04L 27/26*    (2006.01)
*H04L 5/00*    (2006.01)
*H04W 72/51*    (2023.01)
*H04W 72/0453*   (2023.01)

(52) U.S. Cl.
CPC ........... *H04W 72/23* (2023.01); *H04L 5/0055* (2013.01); *H04L 27/2627* (2013.01); *H04W 24/08* (2013.01); *H04W 72/51* (2023.01); *H04W 72/0453* (2013.01)

(58) Field of Classification Search
CPC ..... H04W 72/23; H04W 72/51; H04W 24/08; H04W 72/0453; H04L 5/0055; H04L 27/2627
See application file for complete search history.

(56) References Cited

U.S. PATENT DOCUMENTS

| 8,548,074 | B2* | 10/2013 | Park | H04L 27/26136 |
| | | | | 375/295 |
| 11,497,052 | B1* | 11/2022 | Zhang | H04W 72/0473 |
| 2020/0305198 | A1* | 9/2020 | Li | H04W 28/16 |
| 2020/0314837 | A1* | 10/2020 | Oh | H04W 72/23 |
| 2021/0051708 | A1* | 2/2021 | Agiwal | H04W 56/001 |
| 2021/0194734 | A1* | 6/2021 | Herath | H04L 25/0226 |
| 2022/0046714 | A1* | 2/2022 | Zhou | H04L 5/0044 |
| 2022/0078856 | A1* | 3/2022 | Jeon | H04L 1/1854 |
| 2022/0104265 | A1* | 3/2022 | Bang | H04L 5/0092 |
| 2022/0132464 | A1* | 4/2022 | Agiwal | H04W 24/08 |

(Continued)

FOREIGN PATENT DOCUMENTS

WO    WO-2009055627 A1 *    4/2009    ......... H04L 27/2607

*Primary Examiner* — Michael J Moore, Jr.
(74) *Attorney, Agent, or Firm* — Holland & Hart LLP/Qualcomm Incorporated

(57) ABSTRACT

Methods, systems, and devices for wireless communication are described. A user equipment (UE) may receive control signaling indicating a preamble configuration. The UE may receive a preamble in a time domain. The preamble may include a set of modulated bits during a first portion of an initial symbol duration of a slot. The set of modulated bits may include one or more of a first subset of network temporary identifier bits or a second subset of modulation and coding scheme (MCS) bits. The UE may process the preamble during a second portion of the initial symbol duration of the slot based on the preamble configuration.

30 Claims, 16 Drawing Sheets

(56) References Cited

U.S. PATENT DOCUMENTS

2022/0264449 A1* 8/2022 Horn .................... H04L 5/0094
2022/0369225 A1* 11/2022 Iyer ..................... H04L 5/0053
2022/0386280 A1* 12/2022 Horn .................. H04L 27/2603

* cited by examiner

MODULATED PREAMBLE FOR LOW POWER OPERATIONS

FIELD OF TECHNOLOGY

The following relates to wireless communication, including techniques for modulating preambles associated with wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclose relate to modulating preambles for low power operations. A user equipment (UE) may receive control signaling, such as a radio resource control (RRC) message, a downlink control information (DCI), or a medium access control-control element (MAC-CE) that indicates a preamble configuration. The UE may receive a modulated preamble (e.g., a time domain waveform) during a first symbol duration of a monitoring occasion. The modulated preamble may include a set of modulated bits, which may indicate one or more of a radio network temporary identifier (RNTI) or a modulation and coding scheme (MCS). The UE may decode the modulated preamble based on the preamble configuration. The UE may enter a sleep mode for a remainder of the monitoring occasion based on decoding the modulated preamble, which may result in reduced power consumption at the UE. The described techniques may enable the UE to perform low power operations with greater processing efficiency and lower power consumption, among other benefits. For example, the described techniques may enable the UE to operate in a discontinuous reception (DRX) mode (e.g., a low power state), in which a radio frequency integrated circuit (RFIC) of the UE is periodically deactivated, with greater processing efficiency and improved power efficiency based on decoding the modulated preamble.

A method for wireless communication at a UE is described. The method may include receiving control signaling indicating a preamble configuration, receiving a preamble in a time domain, the preamble including a set of modulated bits during a first portion of an initial symbol duration of a slot, the set of modulated bits including one or more of a first subset of network temporary identifier bits or a second subset of modulation and coding scheme (MCS) bits, and processing the preamble during a second portion of the initial symbol duration of the slot based on the preamble configuration.

An apparatus for wireless communication at a UE is described. The apparatus may include a processor, memory coupled with the processor, and instructions stored in the memory. The instructions may be executable by the processor to cause the apparatus to receive control signaling indicating a preamble configuration, receive a preamble in a time domain, the preamble including a set of modulated bits during a first portion of an initial symbol duration of a slot, the set of modulated bits including one or more of a first subset of network temporary identifier bits or a second subset of MCS bits, and process the preamble during a second portion of the initial symbol duration of the slot based on the preamble configuration.

Another apparatus for wireless communication at a UE is described. The apparatus may include means for receiving control signaling indicating a preamble configuration, means for receiving a preamble in a time domain, the preamble including a set of modulated bits during a first portion of an initial symbol duration of a slot, the set of modulated bits including one or more of a first subset of network temporary identifier bits or a second subset of MCS bits, and means for processing the preamble during a second portion of the initial symbol duration of the slot based on the preamble configuration.

A computer program product comprising a non-transitory computer-readable medium for wireless communications at a UE, the non-transitory computer-readable medium comprising instructions executable by a processor to receive control signaling indicating a preamble configuration, receive a preamble in a time domain, the preamble including a set of modulated bits during a first portion of an initial symbol duration of a slot, the set of modulated bits including one or more of a first subset of network temporary identifier bits or a second subset of MCS bits, and process the preamble during a second portion of the initial symbol duration of the slot based on the preamble configuration.

In some examples of the method, apparatuses, and non-transitory computer-readable medium described herein, processing the preamble may include operations, features, means, or instructions for demodulating the preamble based on the preamble configuration, the preamble including the set of modulated bits that may be modulated in the time domain.

Some examples of the method, apparatuses, and non-transitory computer-readable medium described herein may further include operations, features, means, or instructions for determining a set of candidate preambles associated with the UE based on the preamble configuration, determining a presence of an association between the preamble and a candidate preamble of the set of candidate preambles associated with the UE based on comparing the preamble to the set of candidate preambles associated with the UE. In some examples of the method, apparatuses, and non-transitory computer-readable medium described herein, processing the preamble may be based on the determining of the presence of the association between the preamble and the candidate preamble of the set of candidate preambles associated with the UE.

Some examples of the method, apparatuses, and non-transitory computer-readable medium described herein may further include operations, features, means, or instructions for determining a signal-to-noise ratio (SNR) associated with the preamble based on the determining of the presence of the association between the preamble and the candidate preamble of the set of candidate preambles associated with the UE. In some examples of the method, apparatuses, and non-transitory computer-readable medium described herein, processing the preamble may be based on the determining of the SNR associated with the preamble.

Some examples of the method, apparatuses, and non-transitory computer-readable medium described herein may further include operations, features, means, or instructions for comparing the SNR associated with the preamble to a SNR threshold for an MCS associated with the second subset of MCS bits. In some examples of the method, apparatuses, and non-transitory computer-readable medium described herein, processing the preamble may be based on the comparing of the SNR associated with the preamble to the SNR threshold for the MCS associated with the second subset of MCS bits.

Some examples of the method, apparatuses, and non-transitory computer-readable medium described herein may further include operations, features, means, or instructions for selecting the MCS from a set of MCS s based on a network temporary identifier associated with the UE and a second network temporary identifier associated with a second UE. In some examples of the method, apparatuses, and non-transitory computer-readable medium described herein, comparing the SNR associated with the preamble to the SNR threshold for the MCS associated with the second subset of MCS bits may be based on the selecting.

Some examples of the method, apparatuses, and non-transitory computer-readable medium described herein may further include operations, features, means, or instructions for setting a resolution for a radio frequency circuit associated with the UE based on one or more of the SNR or the MCS, and the comparing of the SNR associated with the preamble to the SNR threshold for the MCS associated with the second subset of MCS bits and performing wireless communication based on setting the resolution for the radio frequency circuit associated with the UE.

Some examples of the method, apparatuses, and non-transitory computer-readable medium described herein may further include operations, features, means, or instructions for refraining from decoding a downlink message associated with the preamble based on the comparing of the SNR associated with the preamble to the SNR threshold for the MCS associated with the second subset of MCS bits and transmitting a negative acknowledgment based on the refraining from decoding the downlink message associated with the preamble.

Some examples of the method, apparatuses, and non-transitory computer-readable medium described herein may further include operations, features, means, or instructions for determining a set of candidate preambles associated with the UE based on the preamble configuration, determining an absence of an association between the preamble and a candidate preamble of the set of candidate preambles associated with the UE based on comparing the preamble to the set of candidate preambles associated with the UE. In some examples of the method, apparatuses, and non-transitory computer-readable medium described herein, processing the preamble may be based on the determining of the absence of the association between the preamble and the candidate preamble of the set of candidate preambles associated with the UE.

In some examples of the method, apparatuses, and non-transitory computer-readable medium described herein, processing the preamble may include operations, features, means, or instructions for refraining from decoding a downlink message associated with the preamble based on the determining of the absence of the association between the preamble and the candidate preamble of the set of candidate preambles associated with the UE.

Some examples of the method, apparatuses, and non-transitory computer-readable medium described herein may further include operations, features, means, or instructions for operating in a discontinuous reception mode until a subsequent slot based on the determining of the absence of the association between the preamble and the candidate preamble of the set of candidate preambles associated with the UE.

Some examples of the method, apparatuses, and non-transitory computer-readable medium described herein may further include operations, features, means, or instructions for receiving a downlink transmission during a symbol duration after the initial symbol duration of the slot based on processing the preamble. In some examples of the method, apparatuses, and non-transitory computer-readable medium described herein, the downlink transmission includes one or more of a physical downlink control channel (PDCCH) transmission or a physical downlink shared channel (PDSCH) transmission.

Some examples of the method, apparatuses, and non-transitory computer-readable medium described herein may further include operations, features, means, or instructions for setting a resolution for an analog-to-digital converter (ADC) based on the processing of the preamble. In some examples of the method, apparatuses, and non-transitory computer-readable medium described herein, receiving the downlink transmission during the symbol duration may be based on the setting of the resolution for the ADC.

In some examples of the method, apparatuses, and non-transitory computer-readable medium described herein, the set of modulated bits includes one or more of a third subset of constellation bits associated with the downlink transmission or a fourth subset of ADC associated with the resolution for the ADC.

Some examples of the method, apparatuses, and non-transitory computer-readable medium described herein may further include operations, features, means, or instructions for transmitting UE capability information. In some examples of the method, apparatuses, and non-transitory computer-readable medium described herein, receiving the control signaling indicating the preamble configuration may be based on the UE capability information.

In some examples of the method, apparatuses, and non-transitory computer-readable medium described herein, the preamble includes an orthogonal preamble sequence.

In some examples of the method, apparatuses, and non-transitory computer-readable medium described herein, the orthogonal preamble sequence includes a Zadoff-Chu sequence.

In some examples of the method, apparatuses, and non-transitory computer-readable medium described herein, the first portion of the initial symbol duration may be greater than or less than the second portion of the initial symbol duration.

In some examples of the method, apparatuses, and non-transitory computer-readable medium described herein, the initial symbol duration includes an orthogonal frequency division multiplexing (OFDM) symbol.

A method for wireless communications at a base station is described. The method may include transmitting control signaling to a UE, the control signaling indicating a preamble configuration and transmitting a preamble in a time domain to the UE during a first portion of an initial symbol duration of a slot, the preamble including a set of modulated bits, the set of modulated bits including one or more of a first subset of network temporary identifier bits or a second subset of MCS bits.

An apparatus for wireless communications at a base station is described. The apparatus may include a processor, memory coupled with the processor, and instructions stored in the memory. The instructions may be executable by the processor to cause the apparatus to transmit control signaling to a UE, the control signaling indicating a preamble configuration and transmit a preamble in a time domain to the UE during a first portion of an initial symbol duration of a slot, the preamble including a set of modulated bits, the set of modulated bits including one or more of a first subset of network temporary identifier bits or a second subset of MCS bits.

Another apparatus for wireless communications at a base station is described. The apparatus may include means for transmitting control signaling to a UE, the control signaling indicating a preamble configuration and means for transmitting a preamble in a time domain to the UE during a first portion of an initial symbol duration of a slot, the preamble including a set of modulated bits, the set of modulated bits including one or more of a first subset of network temporary identifier bits or a second subset of MCS bits.

A computer program product comprising a non-transitory computer-readable medium for wireless communications at a base station, the non-transitory computer-readable medium comprising instructions executable by a processor to transmit control signaling to a UE, the control signaling indicating a preamble configuration and transmit a preamble in a time domain to the UE during a first portion of an initial symbol duration of a slot, the preamble including a set of modulated bits, the set of modulated bits including one or more of a first subset of network temporary identifier bits or a second subset of MCS bits.

In some examples of the method, apparatuses, and non-transitory computer-readable medium described herein, the first subset of network temporary identifier bits includes at least a portion of a network temporary identifier corresponding to the UE.

Some examples of the method, apparatuses, and non-transitory computer-readable medium described herein may further include operations, features, means, or instructions for transmitting a downlink transmission to the UE during a symbol duration after the initial symbol duration of the slot, the downlink transmission including one or more of a PDCCH transmission or a PDSCH transmission.

In some examples of the method, apparatuses, and non-transitory computer-readable medium described herein, the second subset of MCS bits includes an indication of the downlink transmission.

Some examples of the method, apparatuses, and non-transitory computer-readable medium described herein may further include operations, features, means, or instructions for modulating the preamble based on a first MCS, the second subset of MCS bits including an indication of the first MCS.

In some examples of the method, apparatuses, and non-transitory computer-readable medium described herein, the preamble may be associated with a first subcarrier spacing and the downlink transmission may be associated with a second subcarrier spacing different from the first subcarrier spacing.

Some examples of the method, apparatuses, and non-transitory computer-readable medium described herein may further include operations, features, means, or instructions for receiving UE capability information from the UE. In some examples of the method, apparatuses, and non-transitory computer-readable medium described herein, transmitting the control signaling to the UE may be based on the UE capability information.

Some examples of the method, apparatuses, and non-transitory computer-readable medium described herein may further include operations, features, means, or instructions for transmitting the preamble to a set of multiple UEs. In some examples of the method, apparatuses, and non-transitory computer-readable medium described herein, a number of bits in the first subset of network temporary identifier bits may be based on the set of multiple UEs.

Some examples of the method, apparatuses, and non-transitory computer-readable medium described herein may further include operations, features, means, or instructions for generating the first subset of network temporary identifier bits based on multiplexing a set of multiple network temporary identifiers corresponding to the set of multiple UEs.

DETAILED DESCRIPTION

Figure 1:
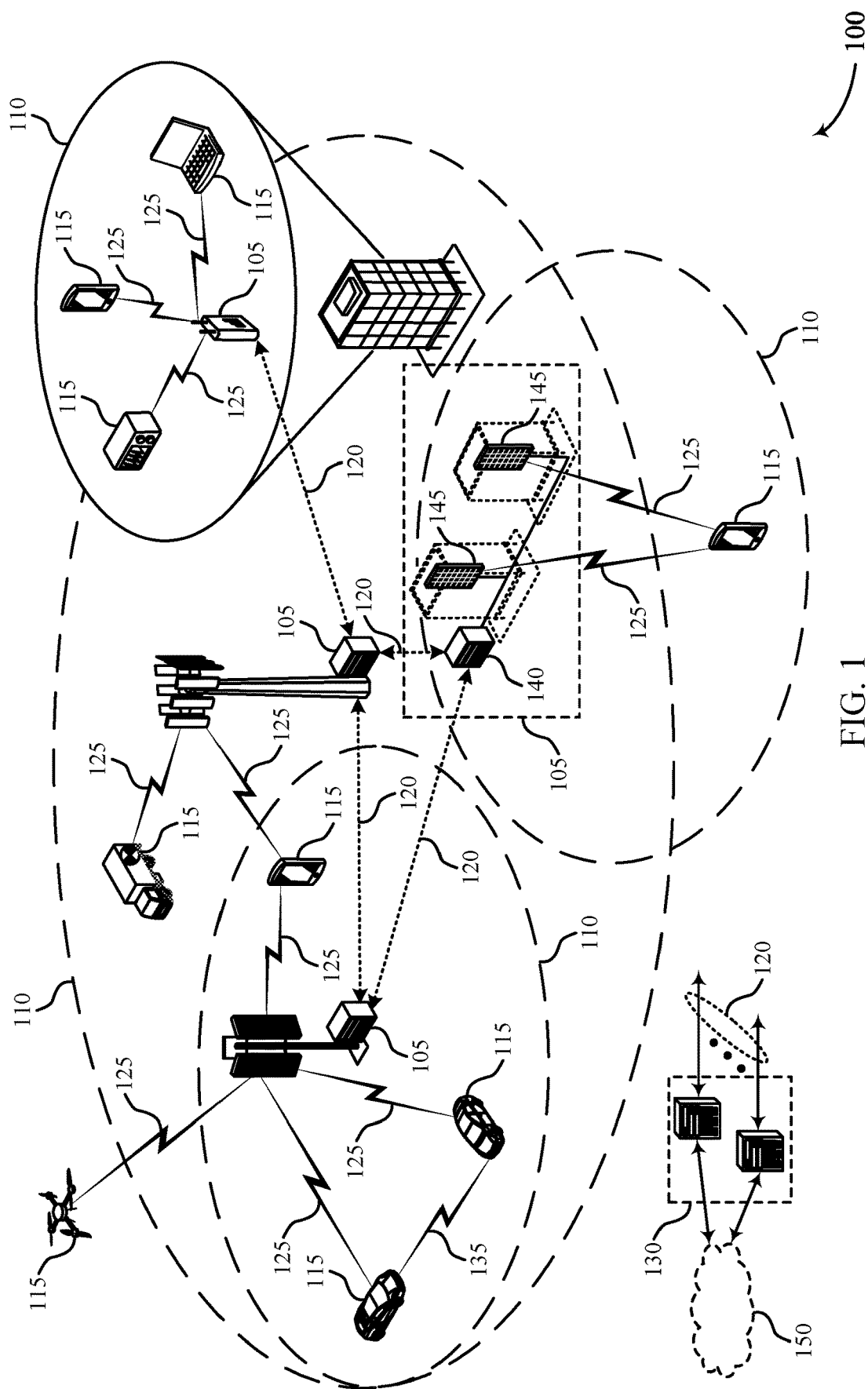
FIGS. 1 and 2 illustrate examples of wireless communications systems that support modulated preambles for low power operations in accordance with aspects of the present disclosure.

Some wireless communications systems may include communication devices, such as a UE or a base station (for example, an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. A UE may enter a sleep power mode to reduce power consumption relative to other power modes and may periodically wake up from the sleep power mode to monitor a downlink channel (e.g., a physical downlink control channel (PDCCH)) for messages from a base station. In some cases, however, the UE may monitor the downlink channel even if the UE is not scheduled to receive any messages from the base station. In such cases, monitoring the downlink channel may result in excessive power consumption at the UE.

In accordance with aspects of the present disclosure, the UE may perform downlink channel monitoring with reduced power consumption and improved processing efficiency based on receiving a modulated preamble (e.g., a time domain waveform) from the base station. The UE may determine whether the base station is scheduled to transmit any messages to the UE (e.g., whether any PDCCH resources have been allocated to the UE) based on decoding the modulated preamble. If the UE is scheduled to receive a downlink message from the base station, the UE may continue monitoring the downlink channel. Alternatively, if the UE is not scheduled to receive a downlink message from the base station, the UE may return to the sleep mode. As a result, the UE may experience reduced power consumption based on using the modulated preamble to selectively monitor the downlink channel.

The modulated preamble may include a first set of modulated bits and a second set of modulated bits. In some examples, the first set of modulated bits may indicate one or more RNTIs associated with UEs that are scheduled to receive downlink messages from the base station. In some examples, the second set of modulated bits may indicate an MCS used to modulate the preamble. In some examples, the base station may transmit the modulated preamble to the UE during a first symbol duration of a slot in which the UE wakes from the sleep mode. The base station may transmit the modulated preamble in an initial portion of the first symbol duration and the UE may decode the modulated preamble in a subsequent portion of the first symbol duration. As such, if the UE is not scheduled to receive any downlink messages from the base station, the UE may return to the sleep mode for a remainder of the slot.

Aspects of the present disclosure may be implemented to realize one or more of the following advantages. The described techniques may provide for reduced power consumption at a UE based on receiving a modulated preamble and using the modulated preamble to selectively monitor a downlink channel for messages from a base station. For example, the described techniques may enable the UE to determine whether the base station is scheduled to transmit any downlink messages to the UE based on the modulated preamble. If the UE is not scheduled to receive any downlink messages from the base station, the UE may enter a sleep mode. As a result, the UE may experience reduced power consumption and improved battery life, among other benefits.

Aspects of the disclosure are initially described in the context of wireless communications systems, a timeline, and a process flow. Aspects of the disclosure are further illustrated by and described with reference to apparatus diagrams, system diagrams, and flowcharts that relate to techniques for modulating preambles for low power operations.

FIG. 1 illustrates an example of a wireless communications system 100 that supports modulated preambles for low power operations in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (e.g., a duration of one modulation symbol) and one subcarrier, where the symbol duration and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol durations (e.g., depending on the length of the cyclic prefix prepended to each symbol duration). In some wireless communications systems 100, a slot may further be divided into multiple mini-slots containing one or more symbol durations. Excluding the cyclic prefix, each symbol duration may contain one or more (e.g., $N_f$) sampling periods. The duration of a symbol duration may depend on the subcarrier spacing or frequency band of operation. A subframe, a slot, a mini-slot, or a symbol duration may be the smallest scheduling unit (e.g., in the time domain) of the wireless communications system 100 and may be referred to as a transmission time interval (TTI). In some examples, the TTI duration (e.g., the number of symbol durations in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol durations and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable or low-latency functions. Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol duration in the slot. In other cases, the device may provide HARQ feedback in a subsequent slot, or according to some other time interval.

In some cases, in the wireless communications system 100, a UE 115 may experience relatively high power consumption while operating in some sub-THz frequency ranges (e.g., a frequency range 4 (FR4), a frequency range 5 (FR5)). These frequency ranges may be associated with relatively higher throughput levels and relatively higher pathloss values. As such, the UE 115 may consume a relatively large amount of power while using one or more antenna elements, analog digital converters (ADCs), or digital front ends (DFEs) to perform baseband processing operations in such frequency ranges. To reduce power consumption and improve power efficiency, the UE 115 may enter a sleep mode and may periodically wake from the sleep mode to monitor a downlink channel for downlink messages (e.g., PDCCH transmissions).

The UE 115 may wake up at a beginning of a transmission time interval (TTI) (e.g., a slot) to monitor for downlink messages from a base station 105. In some cases, the UE 115 may be unable to determine if the base station 105 has allocated PDCCH resources to the UE 115 (e.g., if the UE 115 is scheduled to receive any PDCCH transmissions from the base station 105). That is, the UE 115 may continuously monitor the downlink channel for the entire slot, even if the UE 115 is not scheduled to receive a downlink message from the base station 105. Blindly searching PDCCH candidates (e.g., hypotheses) when the UE 115 is not scheduled to receive any downlink messages (e.g., performing a false wakeup) may result in excessive power consumption at the UE 115.

To decrease power consumption associated with monitoring the downlink channel, the base station 105 may transmit a modulated preamble to the UE 115 in a first symbol duration of the slot. The UE 115 may determine whether the base station 105 has allocated downlink resources to the UE 115 based on decoding the modulated preamble. That is, the UE 115 may determine whether the base station 105 is scheduled to transmit a downlink message to the UE 115 during the TTI based on decoding the modulated preamble. If the UE 115 is not scheduled to receive any downlink messages from the base station 105, the UE 115 may return to sleep mode for a remainder of the TTI.

The modulated preamble may be a time domain waveform that the UE 115 can decode in a relatively short time period (e.g., less than a symbol duration). As such, the UE 115 may be able to deactivate a radio frequency integrated circuit (RFIC) and enter the sleep mode during the first symbol duration of the TTI (e.g., if no downlink messages are allocated to the UE 115). The modulated preamble may include an indication of an MCS or a constellation associated with the modulated preamble. The UE 115 may use the indication of the MCS to configure (e.g., reduce) a number of bits (e.g. a resolution) of an ADC of the UE 115. In the wireless communications system 100, a UE 115 performing downlink channel monitoring and configuring an ADC resolution based on a modulated preamble may result in reduced power consumption and improved processing efficiency at the UE 115, among other benefits.

Figure 2:
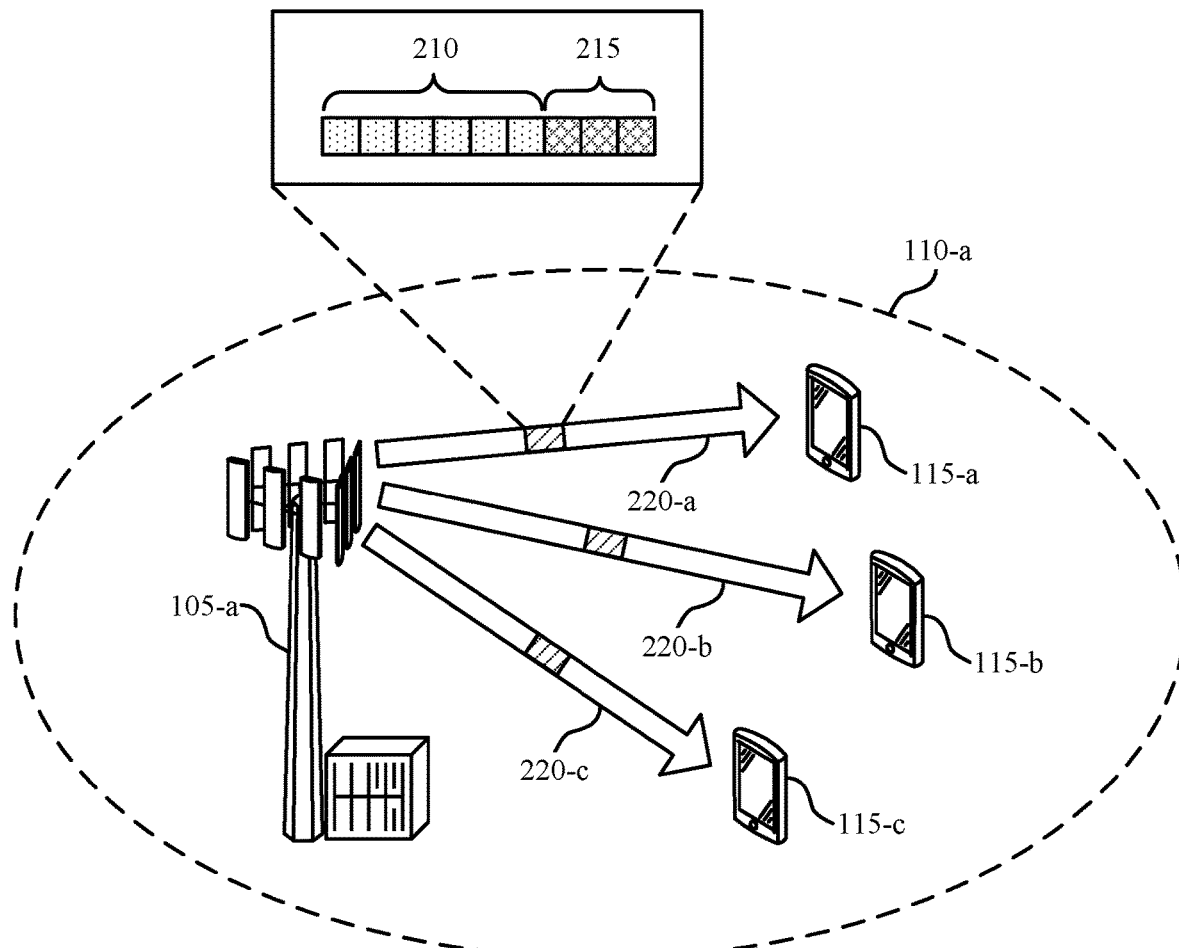

FIG. 2 illustrates an example of a wireless communications system 200 that supports modulated preambles for low power operations in accordance with aspects of the present disclosure. The wireless communications system 200 may implement aspects of the wireless communications system 100 or may be implemented by aspects of the wireless communications system 100 as described with reference to FIG. 1. For example, the wireless communications system 200 may include a base station 105-*a*, a UE 115-*a*, a UE 115-*b*, and a UE 115-*c*, which may be examples of corresponding devices as described with reference to FIG. 1. The base station 105-*a* and the UEs 115 may communicate within a geographic coverage area 110-*a* over communication links 220, which may be examples of a geographic coverage area and a communication link 125 as described with reference to FIG. 1. In the example of FIG. 2, the base station 105-*a* may transmit a modulated preamble 205 to one or more UEs 115 over the one or more communication links 220.

One or more of the UEs 115 may enter a sleep mode (e.g., to reduce power consumption) and may periodically wake from sleep mode to monitor a downlink channel (e.g., a PDCCH) during a PDCCH decoding occasion. In some cases, the PDCCH decoding occasion may have a duration of up to three symbol durations, but may be longer (e.g., up to six symbol durations) due to decoding latency at the UEs 115. In such cases, the UEs 115 may be configured to continuously monitor the downlink channel for the entire PDCCH decoding occasion. That is, one or more radio frequency (RF) chains and DFE chains at the UEs 115 may be active for the entire PDCCH decoding occasion. Additionally, the RF chains and DFE chains may be configured with a highest accuracy setting. As a result, the RF and DFE chains may consume a relatively high amount of power while the UEs 115 are monitoring the downlink channel.

During the PDCCH decoding occasion, one or more of the UEs 115 may monitor the downlink channel for messages from the base station 105-*a*. In some cases, one or more of the UEs 115 may not be scheduled to receive a message from the base station 105-*a*. As such, continuously monitoring the downlink channel for the entire PDCCH decoding occasion may result in excessive power consumption at the one or more UEs 115. In addition, the one or more UEs 115 may be unable to determine which (if any) of the one or more UEs 115 are scheduled to receive downlink messages from the base station 105-*a* during the PDCCH decoding occasion. The one or more UEs 115 may blindly monitor the downlink channel, which may result in higher power consumption and reduced processing efficiency at the one or more UEs 115.

In the wireless communications system 200, the one or more UEs 115 may perform downlink channel monitoring with greater processing efficiency and lower power consumption based on receiving a modulated preamble 205 from the base station 105-*a* prior to the PDCCH decoding occasion. For example, the base station 105-*a* may transmit the modulated preamble 205 to one or more of the UE 115-*a*, the UE 115-*b*, or the UE 115-*c* via one or more of a communication link 220-*a*, a communication link 220-*b*, or a communication link 220-*c*, respectively. In some examples, the base station 105-*a* may transmit the modulated preamble 205 to the UEs 115 based on identifying that the UEs 115 are scheduled to wake from the sleep mode (e.g., are scheduled to be in a connected mode) for the PDCCH decoding occasion.

The modulated preamble 205 may include a first set of modulated bits 210, which may indicate RNTIs of UEs 115 that are scheduled to receive downlink messages from the base station 105-*a* during the PDCCH decoding occasion. The modulated preamble 205 may also include a second set of modulated bits 215, which may indicate an MCS (e.g., a constellation) that the base station 105-*a* used to transmit the modulated preamble 205. The UEs 115 may determine whether to continue monitoring the downlink channel (e.g., if downlink resources are allocated to the UEs 115) or enter the sleep mode (e.g., if downlink resources are not allocated to the UEs 115) based on the first set of modulated bits 210 and the second set of modulated bits 215. In some examples, the UEs 115 may also configure a number of ADC bits (e.g., an ADC resolution) based on the second set of modulated bits 215.

Using the modulated preamble 205 to determine whether the UEs 115 are scheduled to receive any downlink messages from the base station 105-*a* (e.g., based on identifying an existence or non-existence of downlink resource allocations per UE 115) may enable the UEs 115 to experience reduced power consumption and longer battery life, among other benefits. For example, if the UE 115-*a* determines that the base station 105-*a* is not scheduled to transmit a downlink message to the UE 115-*a* during the PDCCH decoding occasion (e.g., based on decoding the modulated preamble 205), the UE 115-*a* may deactivate (e.g., shut down) an RFIC of the UE 115-*a*, which may reduce power consumption at the UE 115-*a*. In addition, determining a number of ADC bits based on the modulated preamble 205 may enable the UEs 115 to operate with greater processing efficiency, among other benefits.

Figure 3:
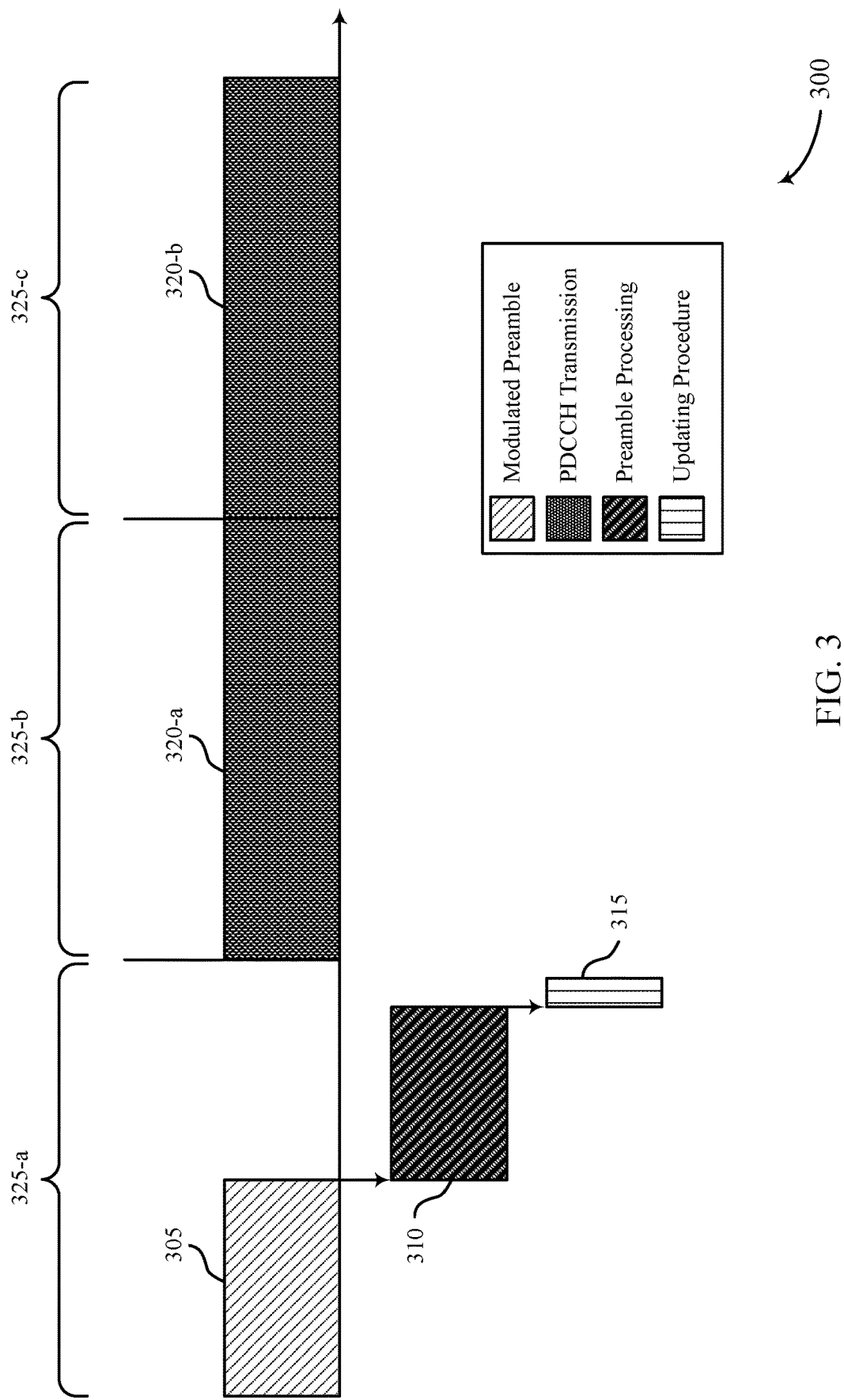
FIG. 3 illustrates an example of a timeline that supports modulated preambles for low power operations in accordance with aspects of the present disclosure.

FIG. 3 illustrates an example of a timeline 300 that supports modulated preambles for low power operations in accordance with aspects of the present disclosure. The timeline 300 may implement aspects of the wireless communications systems 100 and 200 or may be implemented by aspects of the wireless communications systems 100 and 200 as described with reference to FIGS. 1 and 2. For example, the timeline 300 may be implemented by a UE 115 and a base station 105, which may be examples of corresponding devices described with reference to FIGS. 1 and 2. Additionally, the timeline 300 may include a modulated preamble 305, which may be an example of a modulated preamble 205 as described with reference to FIG. 2.

In the example of FIG. 3, a base station 105 may transmit a modulated preamble 305 to a UE 115 during a first symbol duration 325-*a* of a slot. The base station 105 may transmit the modulated preamble 305 during an initial portion (e.g., half) of the first symbol duration 325-*a*. In some examples, the base station 105 may transmit the modulated preamble 305 to the UE 115 based on the UE 115 waking from a sleep mode prior to the first symbol duration 325-*a*. The UE 115 may receive the modulated preamble 305 based on waking from the sleep mode and monitoring a downlink channel (e.g., a PDCCH).

The modulated preamble 305 may include a first set of modulated bits (e.g., sRNTI) and a second set of modulated bits (e.g., sMCS), as described with reference to FIG. 2. The first set of modulated bits may indicate RNTIs of UEs 115 that are scheduled to receive the PDCCH transmissions 320. The first set of modulated bits may include a number of least significant bits (LSBs) associated with the RNTIs (e.g., $L_R=6$). The second set of modulated bits may indicate a low resolution MCS used to generate the modulated preamble 305. For example, the second set of modulated bits may include a number of LSBs associated with the MCS (e.g., $L_M=3$).

The base station 105 may generate the modulated preamble 305 using orthogonal sequences (e.g., Zadoff-Chu sequences), which may enable the base station 105 to indicate multiple RNTIs via the first set of modulated bits (e.g., based on multiplexing the multiple RNTIs). Using orthogonal sequences to generate the modulated preamble 305 may also enable the UE 115 to decode the modulated preamble 305 with lower latency and reduced complexity (e.g., based on using a low complexity detector, also referred to as a simple time domain correlator). When using orthogonal sequences, expected channel delay spread may be relatively low and a correlation output for the orthogonal sequences may be associated with a channel impulse response (CIR).

In some examples, the base station 105 may configure the UE 115 with multiple predefined sequences (e.g., half symbol duration optional time domain sequences) and may map the modulated preamble 305 to one of the predefined sequences. In such examples, the UE 115 may decode the modulated preamble 305 based on comparing the modulated preamble 305 to the predefined sequences. For example, the UE 115 may correlate the received modulated preamble 305 with a number of predefined sequences (e.g., $2^{L_M}$) related to a RNTI of the UE 115.

The base station 105 may use the modulated preamble 305 to notify the UE 115 (and other active UEs 115) of which UEs 115 are scheduled to receive the PDCCH transmissions 320. For example, if the UE 115 decodes the first set of modulated bits and determines that a RNTI of the UE 115 is not indicated by the first set of modulated bits, the UE 115 may deactivate an RFIC and return to sleep mode (e.g., until a subsequent slot) without performing additional processing 310 on the modulated preamble 305 or decoding the PDCCH transmissions 320. Otherwise, if the UE 115 decodes the first set of modulated bits and determines that the first set of modulated bits indicates a RNTI of the UE 115, the UE 115 may perform additional processing 310 on the modulated preamble 305.

The UE 115 may determine a first SNR for the modulated preamble 305 and may compare the first SNR to a second SNR associated with the MCS indicated by the second set of modulated bits. If the first SNR is lower than the second SNR, the UE 115 may refrain from decoding any of the PDCCH transmissions 320. The UE 115 may transmit a negative acknowledgment (NACK) to the base station 105 and may return to sleep mode. Alternatively, if the first SNR is higher than the second SNR, the UE 115 may perform an updating procedure 315 for one or more RF chains and DFE chains at the UE 115. For example, the UE 115 may configure the RF chains and DFE chains to operate with a specific accuracy based on the first SNR, the second SNR, and the indicated MCS. In some examples, if the UE 115 determines that there is a collision between RNTIs in the first set of modulated bits (e.g., if the UE 115 is unable to successfully identify an MCS from the modulated preamble 305), the UE 115 may select a highest MCS supported by the UE 115 and may perform the additional processing 310 based on the highest MCS.

The modulated preamble 305 may be based on capabilities of the UE 115. For example, the UE 115 may transmit, to the base station 105, a capability report indicating that the UE 115 is capable of receiving and decoding the modulated preamble 305. In some examples, if the UE 115 does not support the modulated preamble 305 (e.g., if the UE 115 is unable to receive and decode the modulated preamble 305), the base station 105 may configure the UE 115 with a sleep schedule that aligns with sleep schedules of other UEs 115 that do not support the modulated preamble 305. For example, the base station 105 may configure a first set of UEs 115 supporting transmission of the modulated preamble 305 with a first sleep schedule, and may configure a second set of UEs 115 not supporting transmission of the modulated preamble 305 with a second sleep schedule that is different from the first sleep schedule. The first set of UEs 115 may wake from sleep mode during a first slot, and the second set of UEs 115 may wake from sleep mode during a second slot that is different from the first slot. The base station 105 may selectively transmit the modulated preamble 305 to the first set of UEs 115 during the first slot. Alternatively, the base station 105 may transmit the modulated preamble 305 to the first set of UEs 115 via a frequency band that is not supported by the second set of UEs 115.

In some examples, the base station 105 may transmit other signals to the UE 115 in a subsequent portion of the first symbol duration 325-a. For example, the base station 105 may transmit a PDCCH transmission, a physical downlink shared channel (PDSCH) transmission, a cyclic prefix (CP), or a combination thereof to the UE 115 in the subsequent portion of the first symbol duration 325-a. In some examples, the other signals may be associated with a subcarrier spacing (SCS) that is larger than (e.g., double) an SCS associated with the modulated preamble 305. For example, if the base station 105 transmits the modulated preamble 305 using a bandwidth of 100 MHz, a resource allocation of 66 resource blocks (RBs), and an SCS of 120 kHz, the modulated preamble 305 (e.g., with or without a preamble CP) may include 512 samples. After the modulated preamble 305, the base station 105 may transmit a CP using a resource allocation of 33 RBs, an SCS of 240 kHz, and a fast Fourier transform (FFT) coefficient of 512.

In some examples, the base station 105 may adjust the duration of the modulated preamble 305 (e.g., to another relative portion of the first symbol duration 325-a) based on a number of RNTIs indicated by the first set of modulated bits and an operating frequency range of the base station 105. For example, some frequency ranges (e.g., sub-THz frequency ranges) may be associated with relatively greater beam separations (e.g., for performing space division multiplexing (SDM)). As such, the base station 105 may include relatively fewer bits in the first set of modulated bits, and may ensure that UEs 115 with relatively lower beam separation (e.g., proximate UEs 115) have relatively high coding separation. That is, the base station 105 may assign RNTIs with relatively higher coding separation to UEs 115 with relatively lower beam separation. In some examples (e.g., for sub-THz frequency ranges), the base station 105 may transmit the modulated preamble 305 during a CP of the first symbol duration 325-a. In other examples (e.g., for sub-6 frequency bands), the base station 105 may transmit the modulated preamble 305 during the initial portion of the first symbol duration 325-a, as described herein.

In some examples, if a RNTI of the UE 115 is present in the first set of modulated bits and the first SNR (e.g., of the modulated preamble 305) is higher than the second SNR (e.g., for the indicated MCS), the UE 115 may receive one or more PDCCH transmissions 320 from the base station 105 during one or more corresponding PDCCH decoding occasions. For example, the UE 115 may receive a first PDCCH transmission 320-a during a second symbol duration 325-b (e.g., a first PDCCH decoding occasion). Additionally or alternatively, the UE 115 may receive a second PDCCH transmission 320-b during a third symbol duration 325-c (e.g., a second PDCCH decoding occasion).

Receiving and decoding the modulated preamble 305 (e.g., a u-sleep preamble) in accordance with the described techniques may enable the UE 115 to operate with greater processing efficiency and reduced power consumption based on reducing the time that RF chains and DFE chains at the UE 115 are in an active state. For example, if the UE 115 is not scheduled to receive any PDCCH transmissions 320 from the base station 105 during PDCCH decoding occasions (e.g., if PDCCH resources are not allocated to the UE 115), the UE 115 may deactivate the RF chains and DFE chains in the first symbol duration 325-a of the slot rather than keeping the RF chains and DFE chains active for the PDCCH decoding occasions.

Figure 4:
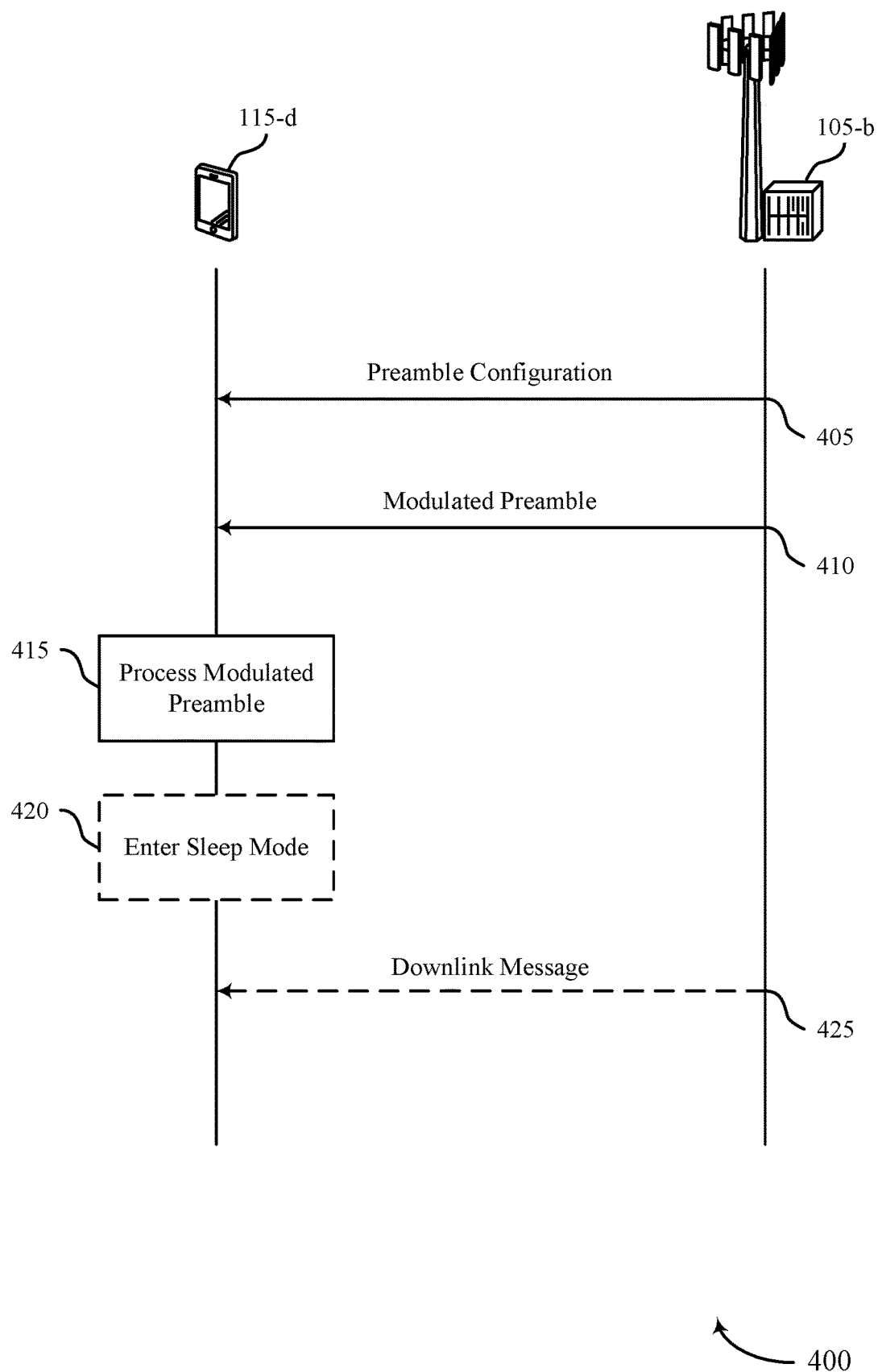
FIG. 4 illustrates an example of a process flow that supports modulated preambles for low power operations in accordance with aspects of the present disclosure.

FIG. 4 illustrates an example of a process flow 400 that supports modulated preambles for low power operations in accordance with aspects of the present disclosure. The process flow 400 may implement aspects of the wireless communications systems 100 and 200 or may be implemented by aspects of the wireless communications systems 100 and 200 as described with reference to FIGS. 1 and 2. For example, the process flow 400 may implement or be implemented by a base station 105-b and a UE 115-b. In the following description of the process flow 400, the operations between the base station 105-b and the UE 115-d may be performed in a different order than the example order shown, or the operations performed by the base station 105-b and the UE 115-d may be performed at different times. Some operations may also be omitted from the process flow 400, and other operations may be added to the process flow 400. In the example of FIG. 4, the UE 115-d may selectively monitor a downlink channel based on receiving a modulated preamble from the base station 105-b.

At 405, the UE 115-d may receive a preamble configuration from the base station 105-b. In some examples, the UE 115-d may receive the preamble configuration via RRC signaling (e.g., during an RRC configuration period). In other examples, the UE 115-d may receive the preamble configuration via dynamic signaling. For example, the UE 115-d may receive the preamble configuration in a DCI message or a MAC-CE. The preamble configuration may be based on a capability of the UE 115-d to support transmission of a modulated preamble. In some examples, the preamble configuration may include a number of predefined time domain sequences. Additionally or alternatively, the preamble configuration may indicate a number of bits to be included in a subsequent preamble.

At 410, the base station 105-b may transmit a modulated preamble to the UE 115-d during a first symbol duration of a slot. More specifically, the UE 115-d may transmit the modulated preamble to the UE 115-b during an initial portion of the first symbol duration. In some examples, the base station 105-b may transmit the modulated preamble to the UE 115-d based on the UE 115-d waking from a sleep mode to monitor a downlink channel (e.g., a PDCCH). For example, the UE 115-d may be in a discontinuous reception (DRX) mode and may periodically wake from sleep mode to check (e.g., search) for downlink messages from the base station 105-b.

The modulated preamble may be a time domain waveform that maps to one of the predefined time domain sequences of the preamble configuration. The modulated waveform may include a first set of modulated bits, which may indicate one or more RNTIs corresponding to UEs 115 with PDCCH resource allocations in the slot. That is, the first set of modulated bits may indicate UEs 115 that are scheduled to receive PDCCH transmissions from the base station 105-*b* during the slot. The modulated waveform may also include a second set of modulated bits, which may indicate an MCS associated with (e.g., used to generate) the modulated preamble. In some examples, the UE 115-*d* may configure a number of ADC bits (e.g., an ADC resolution) based on the indicated MCS.

At 415, the UE 115-*d* may process the modulated preamble during a subsequent portion of the first symbol duration based on the received preamble configuration. For example, the UE 115-*d* may compare the received modulated preamble to the number of predefined time domain sequences in the preamble configuration and may identify one of the predefined time domain sequences that corresponds to the modulated preamble. In some examples, the UE 115-*d* may process the modulated preamble based on determining an SNR of the received modulated preamble and comparing the determined SNR to a threshold SNR associated with the indicated MCS. The UE 115-*d* may configure one or more RF chains and DFE chains at the UE 115-*d* based on comparing the determined SNR to the threshold SNR.

In some examples, the UE 115-*d* may enter sleep mode at 420 based on processing the modulated preamble. For example, if the UE 115-*d* decodes the first set of modulated bits and determines that a RNTI of the UE 115-*d* is absent from (e.g., is not indicated by) the first set of modulated bits, the UE 115-*d* may deactivate an RFIC (e.g., one or more RF chains and DFE chains) at the UE 115-*d* and may enter sleep mode. Alternatively, if the UE 115-*d* determines that the RNTI of the UE 115-*d* is present in the first set of modulated bits and that the determined SNR is lower than the threshold SNR, the UE 115-*d* may transmit a NACK to the base station 105-*b* and enter sleep mode. In some examples, the UE 115-*d* may enter sleep mode during a subsequent portion of the first symbol duration. That is, the UE 115-*d* may enter sleep mode prior to an end of the first symbol.

In other examples, the UE 115-*d* may attempt to receive a downlink message from the base station 105-*b* at 425 based on processing the modulated preamble. For example, if the UE 115-*d* decodes the first set of modulated bits and determines that a RNTI of the UE 115-*d* is present in (e.g., is indicated by) the first set of modulated bits, the UE 115-*d* may continue monitoring the downlink channel for the downlink message. If the UE 115-*d* is unable to successfully receive and decode the downlink message, the UE 115-*d* may transmit a NACK to the base station 105-*b*.

Processing the modulated preamble in accordance with the described techniques may enable the UE 115-*d* to perform downlink channel monitoring with reduced power consumption and greater processing efficiency, among other benefits. In addition, the described techniques may improve low power operations at the UE 115-*d*. For example, the described techniques may enable the UE 115-*d* to operate in a DRX mode (e.g., a low power state), in which an RFIC of the UE 115-*d* is periodically deactivated, with greater processing efficiency and improved power efficiency based on processing the modulated preamble.

Figure 5:
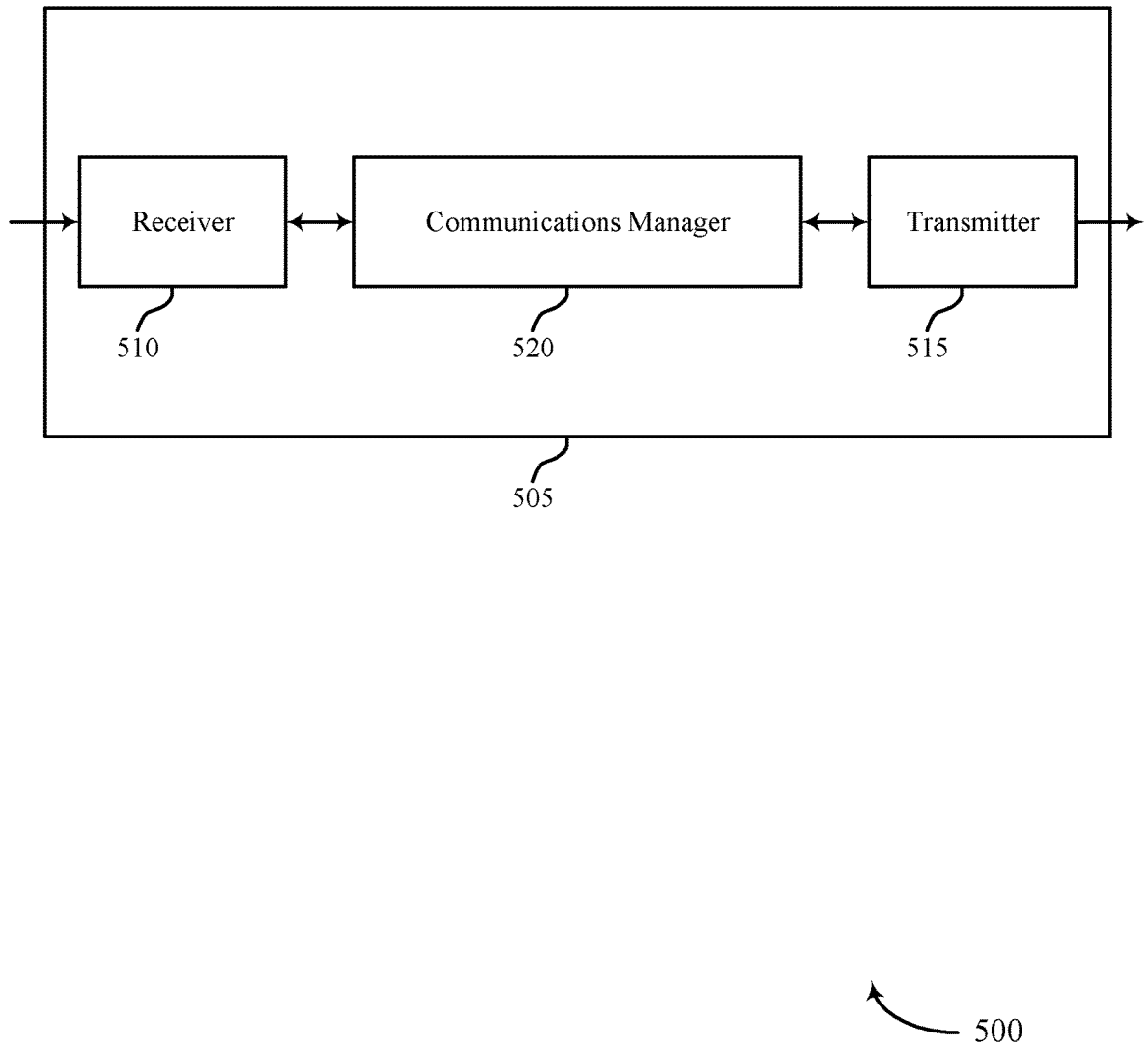
FIGS. 5 and 6 show block diagrams of devices that support modulated preambles for low power operations in accordance with aspects of the present disclosure.

FIG. 5 shows a block diagram 500 of a device 505 that supports modulated preambles for low power operations in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to modulated preambles for low power operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to modulated preambles for low power operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of modulated preambles for low power operations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving control signaling indicating a preamble configuration. The communications manager 520 may be configured as or otherwise support a means for receiving a preamble in a time domain, the preamble including a set of modulated bits during a first portion of an initial symbol duration of a slot, the set of modulated bits including one or more of a first subset of network temporary identifier bits or a second subset of MCS bits. The communications manager 520 may be configured as or otherwise support a means for processing the preamble during a second portion of the initial symbol duration of the slot based on the preamble configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources.

Figure 6:
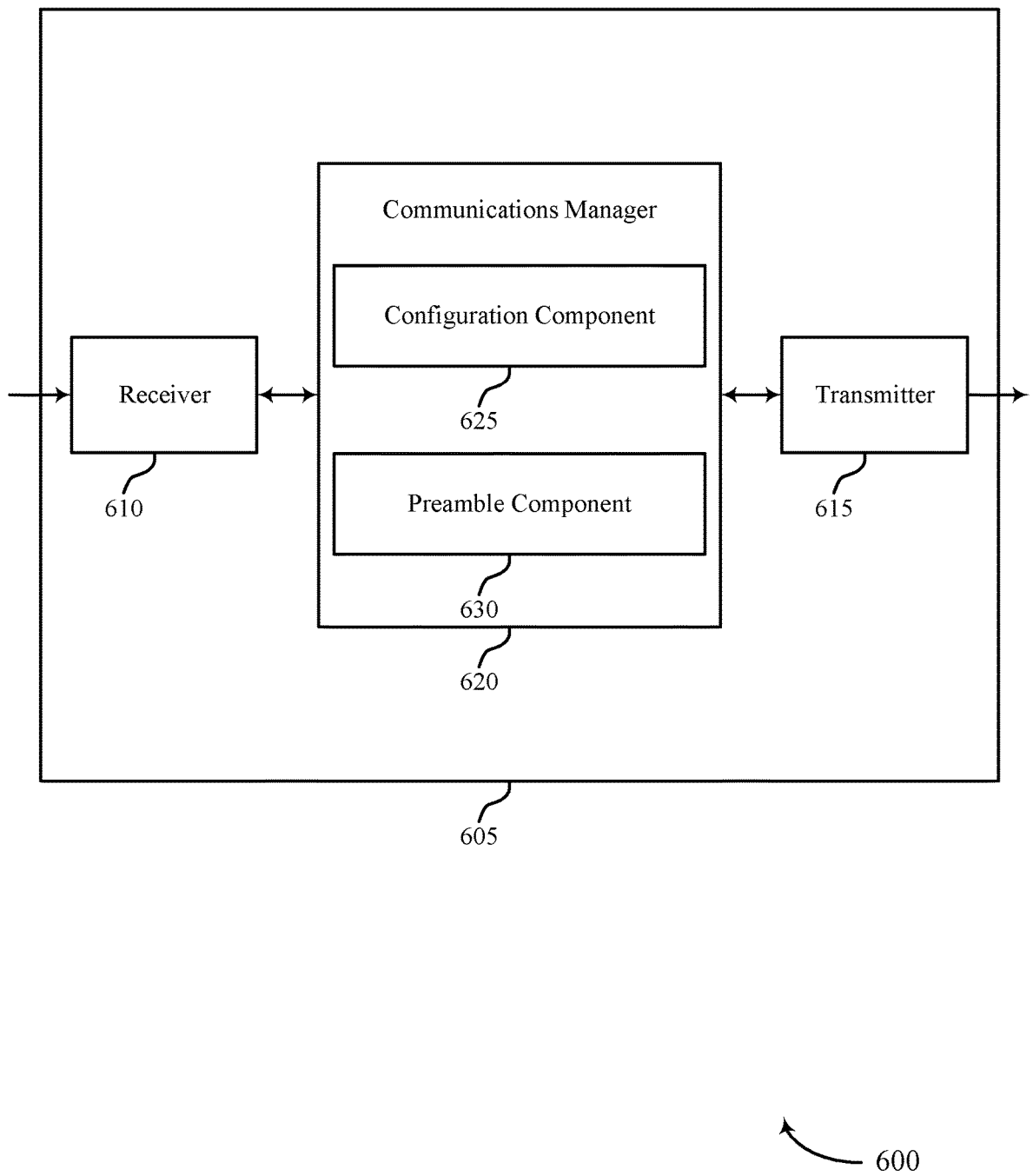

FIG. 6 shows a block diagram 600 of a device 605 that supports modulated preambles for low power operations in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to modulated preambles for low power operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to modulated preambles for low power operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of modulated preambles for low power operations as described herein. For example, the communications manager 620 may include a configuration component 625 a preamble component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration component 625 may be configured as or otherwise support a means for receiving control signaling indicating a preamble configuration. The preamble component 630 may be configured as or otherwise support a means for receiving a preamble in a time domain, the preamble including a set of modulated bits during a first portion of an initial symbol duration of a slot, the set of modulated bits including one or more of a first subset of network temporary identifier bits or a second subset of MCS bits. The preamble component 630 may be configured as or otherwise support a means for processing the preamble during a second portion of the initial symbol duration of the slot based on the preamble configuration.

Figure 7:
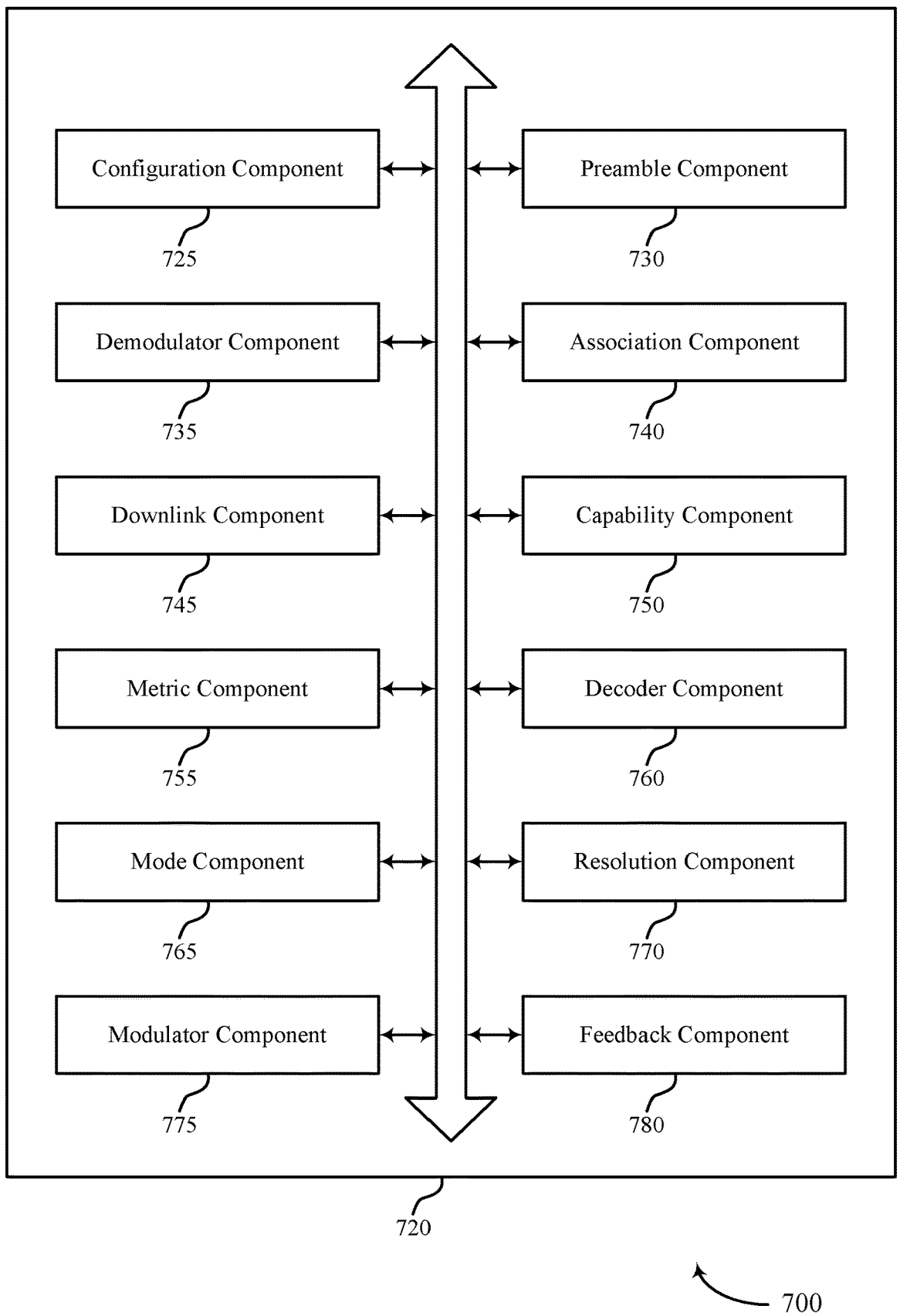
FIG. 7 shows a block diagram of a communications manager that supports modulated preambles for low power operations in accordance with aspects of the present disclosure.

FIG. 7 shows a block diagram 700 of a communications manager 720 that supports modulated preambles for low power operations in accordance with aspects of the present disclosure. The communications manager 720 may be an example of aspects of a communications manager 520, a communications manager 620, or both, as described herein. The communications manager 720, or various components thereof, may be an example of means for performing various aspects of modulated preambles for low power operations as described herein. For example, the communications manager 720 may include a configuration component 725, a preamble component 730, a demodulator component 735, an association component 740, a downlink component 745, a capability component 750, a metric component 755, a decoder component 760, a mode component 765, a resolution component 770, a modulator component 775, a feedback component 780, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving control signaling indicating a preamble configuration. The preamble component 730 may be configured as or otherwise support a means for receiving a preamble in a time domain, the preamble including a set of modulated bits during a first portion of an initial symbol duration of a slot, the set of modulated bits including one or more of a first subset of network temporary identifier bits or a second subset of MCS bits. In some examples, the preamble component 730 may be configured as or otherwise support a means for processing the preamble during a second portion of the initial symbol duration of the slot based on the preamble configuration.

In some examples, to support processing the preamble, the demodulator component 735 may be configured as or otherwise support a means for demodulating the preamble based on the preamble configuration, the preamble including the set of modulated bits that are modulated in the time domain. By demodulating the preamble based on the preamble configuration in accordance with examples as described herein, the UE may experience reduced power consumption and more efficient utilization of communication resources. In some examples, the preamble component 730 may be configured as or otherwise support a means for determining a set of candidate preambles associated with the UE based on the preamble configuration. In some examples, the association component 740 may be configured as or otherwise support a means for determining a presence of an association between the preamble and a candidate preamble of the set of candidate preambles associated with the UE based on comparing the preamble to the set of candidate preambles associated with the UE. In some examples, the preamble component 730 may be configured as or otherwise support a means for processing the preamble based on the determining of the presence of the association between the preamble and the candidate preamble of the set of candidate preambles associated with the UE. By processing the preamble based on the determining of the presence of the association between the preamble and the candidate preamble of the set of candidate preambles associated with the UE, the UE may experience reduced processing.

In some examples, the metric component 755 may be configured as or otherwise support a means for determining an SNR associated with the preamble based on the determining of the presence of the association between the preamble and the candidate preamble of the set of candidate preambles associated with the UE. In some examples, the preamble component 730 may be configured as or otherwise support a means for processing the preamble based on the determining of the SNR associated with the preamble. In some examples, the metric component 755 may be configured as or otherwise support a means for comparing the SNR associated with the preamble to a SNR threshold for a MCS associated with the second subset of MCS bits. In some examples, the preamble component 730 may be configured as or otherwise support a means for processing the preamble based on the comparing of the SNR associated with the preamble to the SNR threshold for the MCS associated with the second subset of MCS bits. By processing the preamble based on the comparing of the SNR associated with the preamble to the SNR threshold for the MCS associated with the second subset of MCS bits, the UE may experience reduced processing and efficient resource usage associated with the processing.

In some examples, the modulator component 775 may be configured as or otherwise support a means for selecting the MCS from a set of MCS based on a network temporary identifier associated with the UE and a second network temporary identifier associated with a second UE. In some examples, the metric component 755 may be configured as or otherwise support a means for comparing the SNR associated with the preamble to the SNR threshold for the MCS associated with the second subset of MCS bits based on the selecting. In some examples, the resolution component 770 may be configured as or otherwise support a means for setting a resolution for a radio frequency circuit associated with the UE based on one or more of the SNR or the MCS, and the comparing of the SNR associated with the preamble to the SNR threshold for the MCS associated with the second subset of MCS bits. By setting a resolution for a radio frequency circuit associated with the UE, the UE may experience an improved battery life for the UE. In some examples, the resolution component 770 may be configured as or otherwise support a means for performing wireless communication based on setting the resolution for the radio frequency circuit associated with the UE.

In some examples, the decoder component 760 may be configured as or otherwise support a means for refraining from decoding a downlink message associated with the preamble based on the comparing of the SNR associated with the preamble to the SNR threshold for the MCS associated with the second subset of MCS bits. In some examples, the feedback component 780 may be configured as or otherwise support a means for transmitting a negative acknowledgment based on the refraining from decoding the downlink message associated with the preamble.

In some examples, the preamble component 730 may be configured as or otherwise support a means for determining a set of candidate preambles associated with the UE based on the preamble configuration. In some examples, the association component 740 may be configured as or otherwise support a means for determining an absence of an association between the preamble and a candidate preamble of the set of candidate preambles associated with the UE based on comparing the preamble to the set of candidate preambles associated with the UE. In some examples, the preamble component 730 may be configured as or otherwise support a means for processing the preamble based on the determining of the absence of the association between the preamble and the candidate preamble of the set of candidate preambles associated with the UE. In some examples, to support processing the preamble, the decoder component 760 may be configured as or otherwise support a means for refraining from decoding a downlink message associated with the preamble based on the determining of the absence of the association between the preamble and the candidate preamble of the set of candidate preambles associated with the UE. In some examples, the mode component 765 may be configured as or otherwise support a means for operating in a discontinuous reception mode until a subsequent slot based on the determining of the absence of the association between the preamble and the candidate preamble of the set of candidate preambles associated with the UE.

In some examples, the downlink component 745 may be configured as or otherwise support a means for receiving a downlink transmission during a symbol duration after the initial symbol duration of the slot based on processing the preamble. In some examples, the downlink transmission includes one or more of a PDCCH transmission or a PDSCH transmission. In some examples, the resolution component 770 may be configured as or otherwise support a means for setting a resolution for an ADC based on the processing of the preamble. In some examples, the downlink component 745 may be configured as or otherwise support a means for receiving the downlink transmission during the symbol duration is based on the setting of the resolution for the ADC. In some examples, the set of modulated bits includes one or more of a third subset of constellation bits associated with the downlink transmission or a fourth subset of ADC bits associated with the resolution for the ADC.

In some examples, the capability component 750 may be configured as or otherwise support a means for transmitting UE capability information, where receiving the control signaling indicating the preamble configuration is based on the UE capability information. In some examples, the preamble includes an orthogonal preamble sequence. In some examples, the orthogonal preamble sequence includes a Zadoff-Chu sequence. In some examples, the first portion of the initial symbol duration is greater than or less than the second portion of the initial symbol duration. In some examples, the initial symbol duration includes an OFDM symbol.

Figure 8:
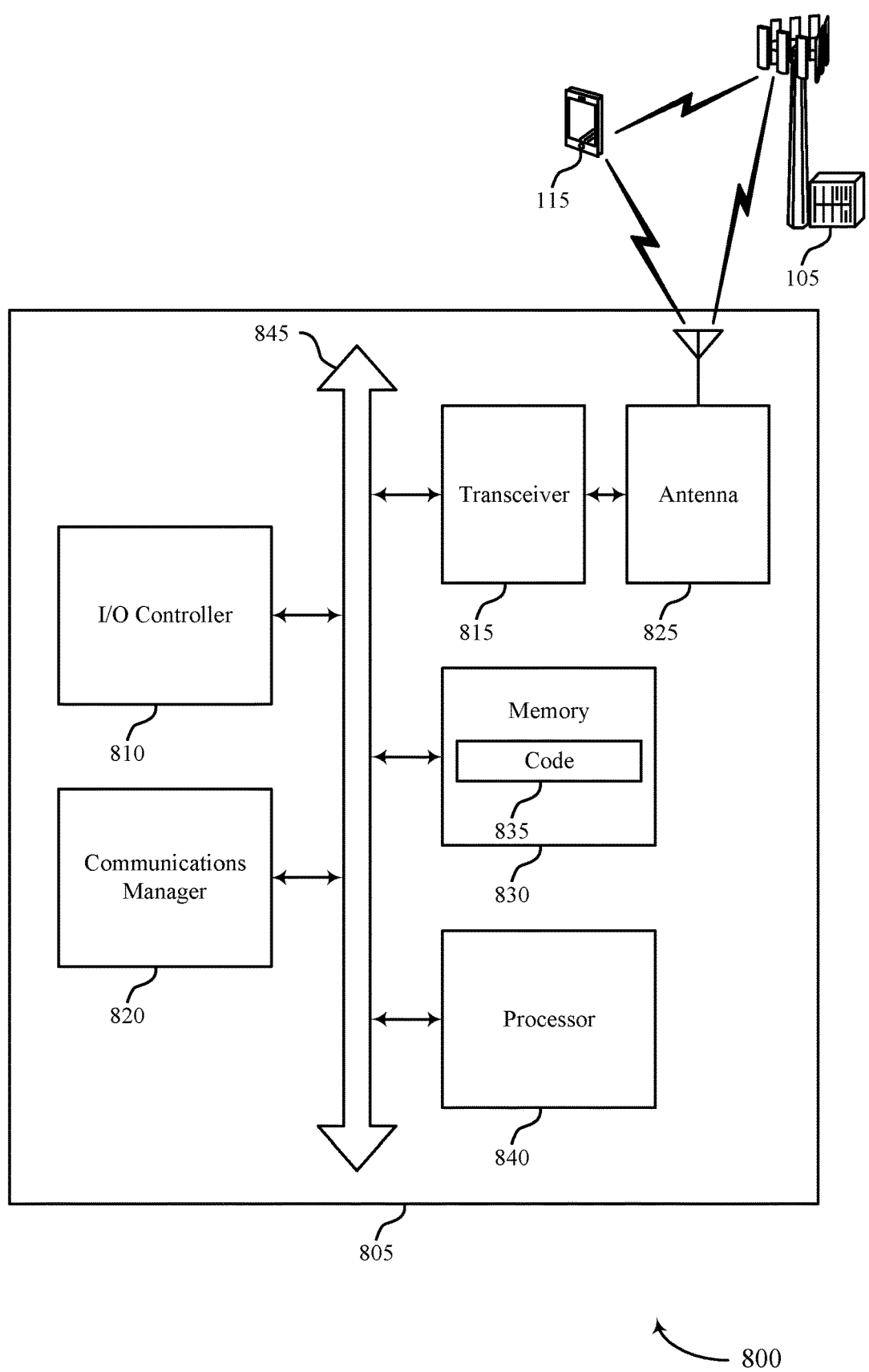
FIG. 8 shows a diagram of a system including a device that supports modulated preambles for low power operations in accordance with aspects of the present disclosure.

FIG. 8 shows a diagram of a system 800 including a device 805 that supports modulated preambles for low power operations in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting modulated preambles for low power operations). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a preamble configuration. The communications manager 820 may be configured as or otherwise support a means for receiving a preamble in a time domain, the preamble including a set of modulated bits during a first portion of an initial symbol duration of a slot, the set of modulated bits including one or more of a first subset of network temporary identifier bits or a second subset of MCS bits. The communications manager 820 may be configured as or otherwise support a means for processing the preamble during a second portion of the initial symbol duration of the slot based on the preamble configuration. By including or configuring the communications manager 820 in accordance with examples as described herein, the device 805 may support techniques for improved communication reliability, reduced latency, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of modulated preambles for low power operations as described herein, or the processor 840 and the memory 830 may be otherwise configured to perform or support such operations.

Figure 9:
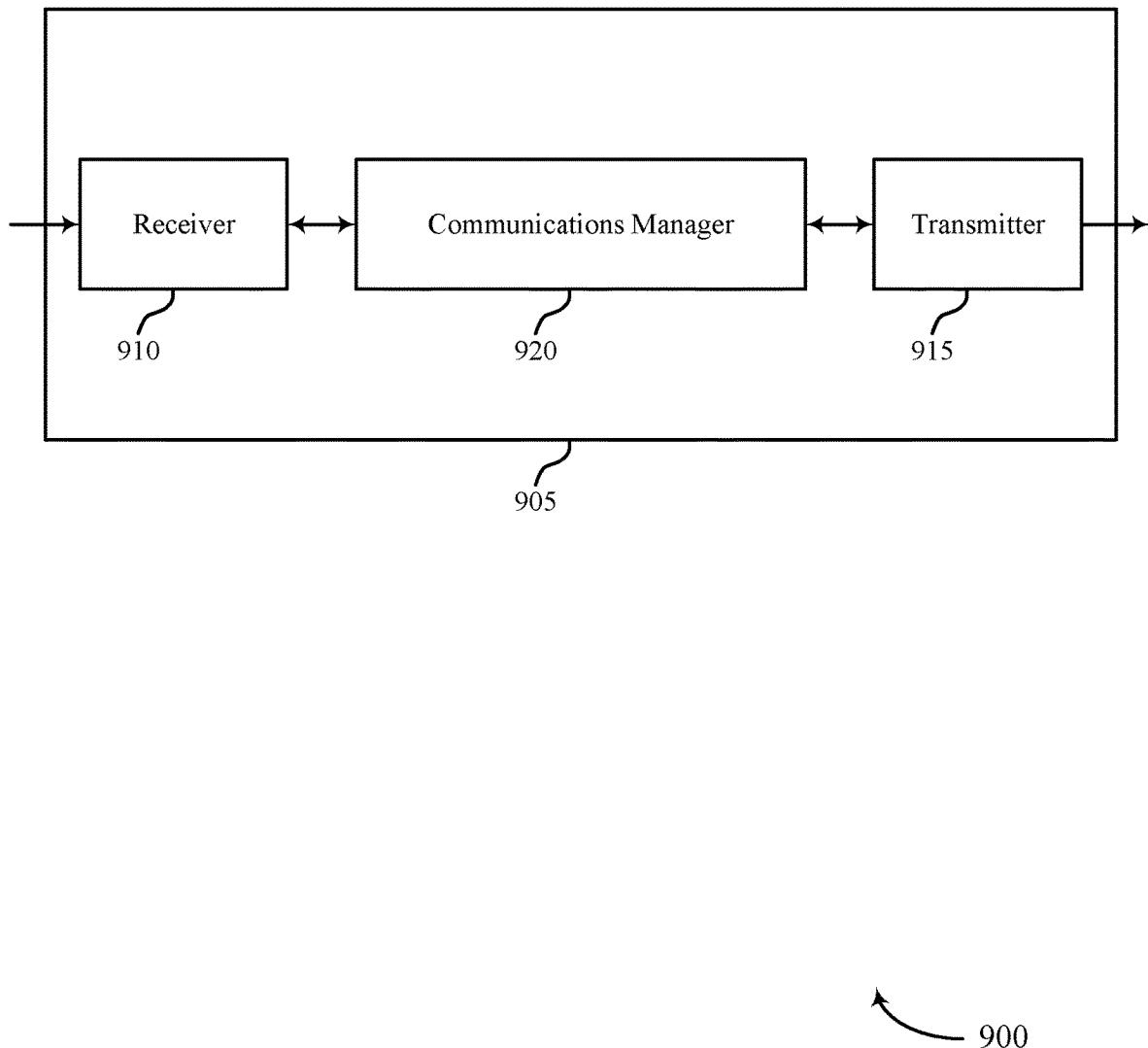
FIGS. 9 and 10 show block diagrams of devices that support modulated preambles for low power operations in accordance with aspects of the present disclosure.

FIG. 9 shows a block diagram 900 of a device 905 that supports modulated preambles for low power operations in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to modulated preambles for low power operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to modulated preambles for low power operations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of modulated preambles for low power operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting control signaling to a UE, the control signaling indicating a preamble configuration. The communications manager 920 may be configured as or otherwise support a means for transmitting a preamble in a time domain to the UE during a first portion of an initial symbol duration of a slot, the preamble including a set of modulated bits, the set of modulated bits including one or more of a first subset of network temporary identifier bits or a second subset of MCS bits.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources.

Figure 10:
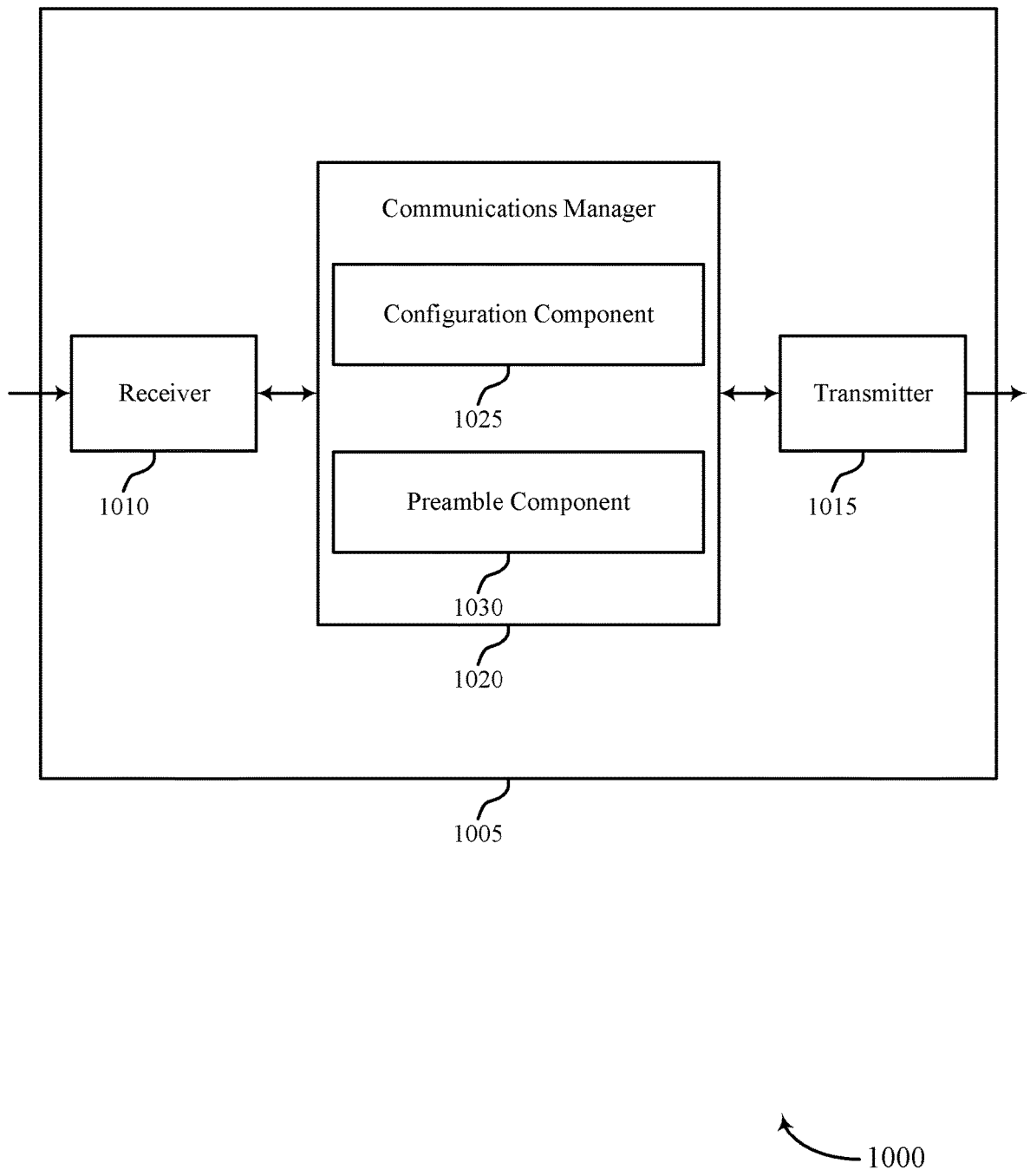

FIG. 10 shows a block diagram 1000 of a device 1005 that supports modulated preambles for low power operations in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to modulated preambles for low power operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to modulated preambles for low power operations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of modulated preambles for low power operations as described herein. For example, the communications manager 1020 may include a configuration component 1025 a preamble component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The configuration component 1025 may be configured as or otherwise support a means for transmitting control signaling to a UE, the control signaling indicating a preamble configuration. The preamble component 1030 may be configured as or otherwise support a means for transmitting a preamble in a time domain to the UE during a first portion of an initial symbol duration of a slot, the preamble including a set of modulated bits, the set of modulated bits including one or more of a first subset of network temporary identifier bits or a second subset of MCS bits.

Figure 11:
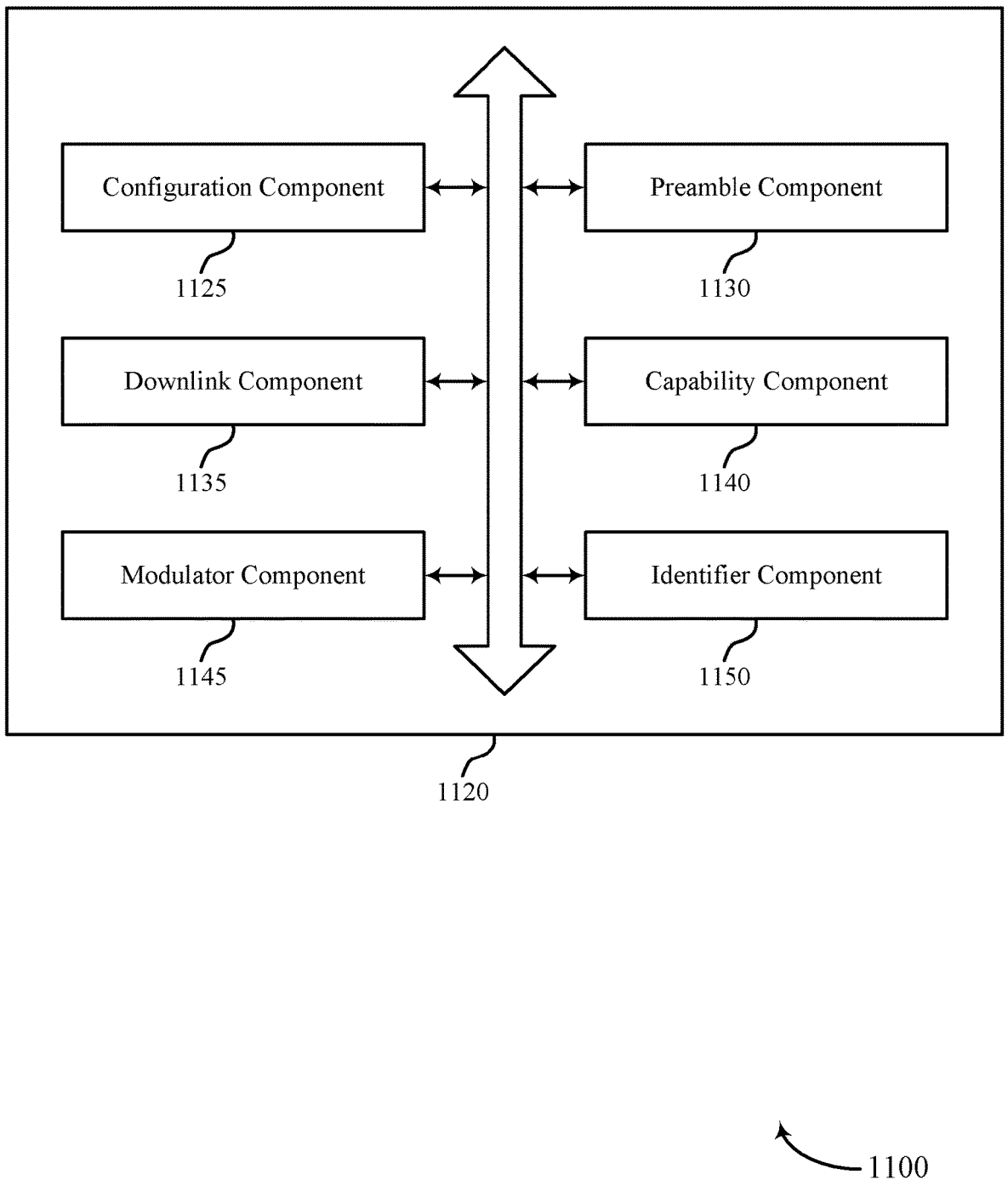
FIG. 11 shows a block diagram of a communications manager that supports modulated preambles for low power operations in accordance with aspects of the present disclosure.

FIG. 11 shows a block diagram 1100 of a communications manager 1120 that supports modulated preambles for low power operations in accordance with aspects of the present disclosure. The communications manager 1120 may be an example of aspects of a communications manager 920, a communications manager 1020, or both, as described herein. The communications manager 1120, or various components thereof, may be an example of means for performing various aspects of modulated preambles for low power operations as described herein. For example, the communications manager 1120 may include a configuration component 1125, a preamble component 1130, a downlink component 1135, a capability component 1140, a modulator component 1145, an identifier component 1150, or any combination thereof. Each of these components may communicate, directly or indirectly, with one another (e.g., via one or more buses).

The communications manager 1120 may support wireless communications at a base station in accordance with examples as disclosed herein. The configuration component 1125 may be configured as or otherwise support a means for transmitting control signaling to a UE, the control signaling indicating a preamble configuration. The preamble component 1130 may be configured as or otherwise support a means for transmitting a preamble in a time domain to the UE during a first portion of an initial symbol duration of a slot, the preamble including a set of modulated bits, the set of modulated bits including one or more of a first subset of network temporary identifier bits or a second subset of MCS bits.

In some examples, the first subset of network temporary identifier bits includes at least a portion of a network temporary identifier corresponding to the UE. In some examples, the downlink component 1135 may be configured as or otherwise support a means for transmitting a downlink transmission to the UE during a symbol duration after the initial symbol duration of the slot, the downlink transmission including one or more of a PDCCH transmission or a PDSCH transmission. In some examples, the second subset of MCS bits includes an indication of the downlink transmission.

In some examples, the modulator component 1145 may be configured as or otherwise support a means for modulating the preamble based on a first MCS, the second subset of MCS bits including an indication of the first MCS. In some examples, the preamble is associated with a first subcarrier spacing and the downlink transmission is associated with a second subcarrier spacing different from the first subcarrier spacing. In some examples, the capability component 1140 may be configured as or otherwise support a means for receiving UE capability information from the UE, where transmitting the control signaling to the UE is based on the UE capability information.

In some examples, the preamble component 1130 may be configured as or otherwise support a means for transmitting the preamble to a set of multiple UEs, where a number of bits in the first subset of network temporary identifier bits is based on the set of multiple UEs. In some examples, the identifier component 1150 may be configured as or otherwise support a means for generating the first subset of network temporary identifier bits based on multiplexing a set of multiple network temporary identifiers corresponding to the set of multiple UEs.

Figure 12:
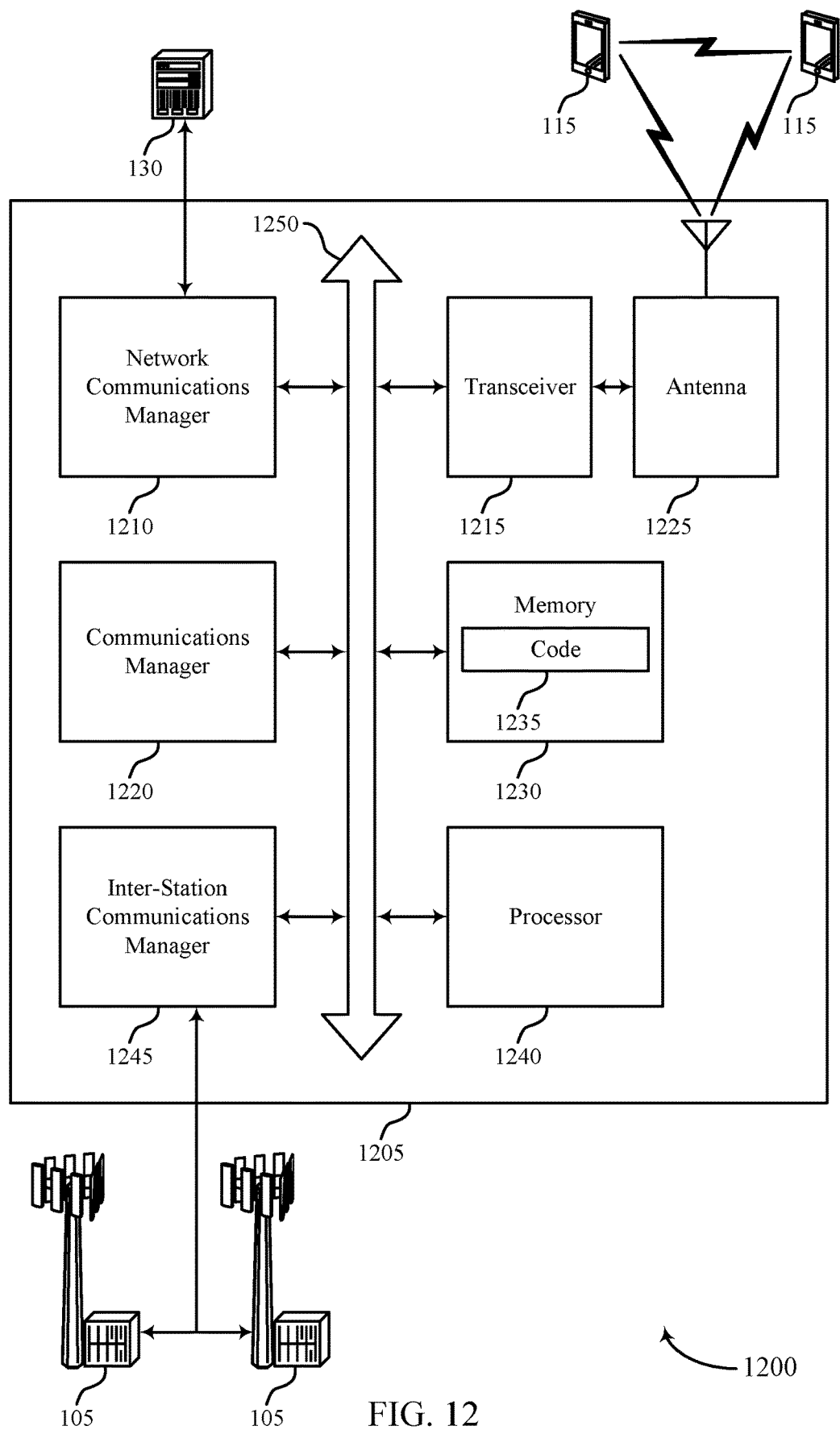
FIG. 12 shows a diagram of a system including a device that supports modulated preambles for low power operations in accordance with aspects of the present disclosure.

FIG. 12 shows a diagram of a system 1200 including a device 1205 that supports modulated preambles for low power operations in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting modulated preambles for low power operations). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting control signaling to a UE, the control signaling indicating a preamble configuration. The communications manager 1220 may be configured as or otherwise support a means for transmitting a preamble in a time domain to the UE during a first portion of an initial symbol duration of a slot, the preamble including a set of modulated bits, the set of modulated bits including one or more of a first subset of network temporary identifier bits or a second subset of MCS bits. By including or configuring the communications manager 1220 in accordance with examples as described herein, the device 1205 may support techniques for improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of modulated preambles for low power operations as described herein, or the processor 1240 and the memory 1230 may be otherwise configured to perform or support such operations.

Figure 13:
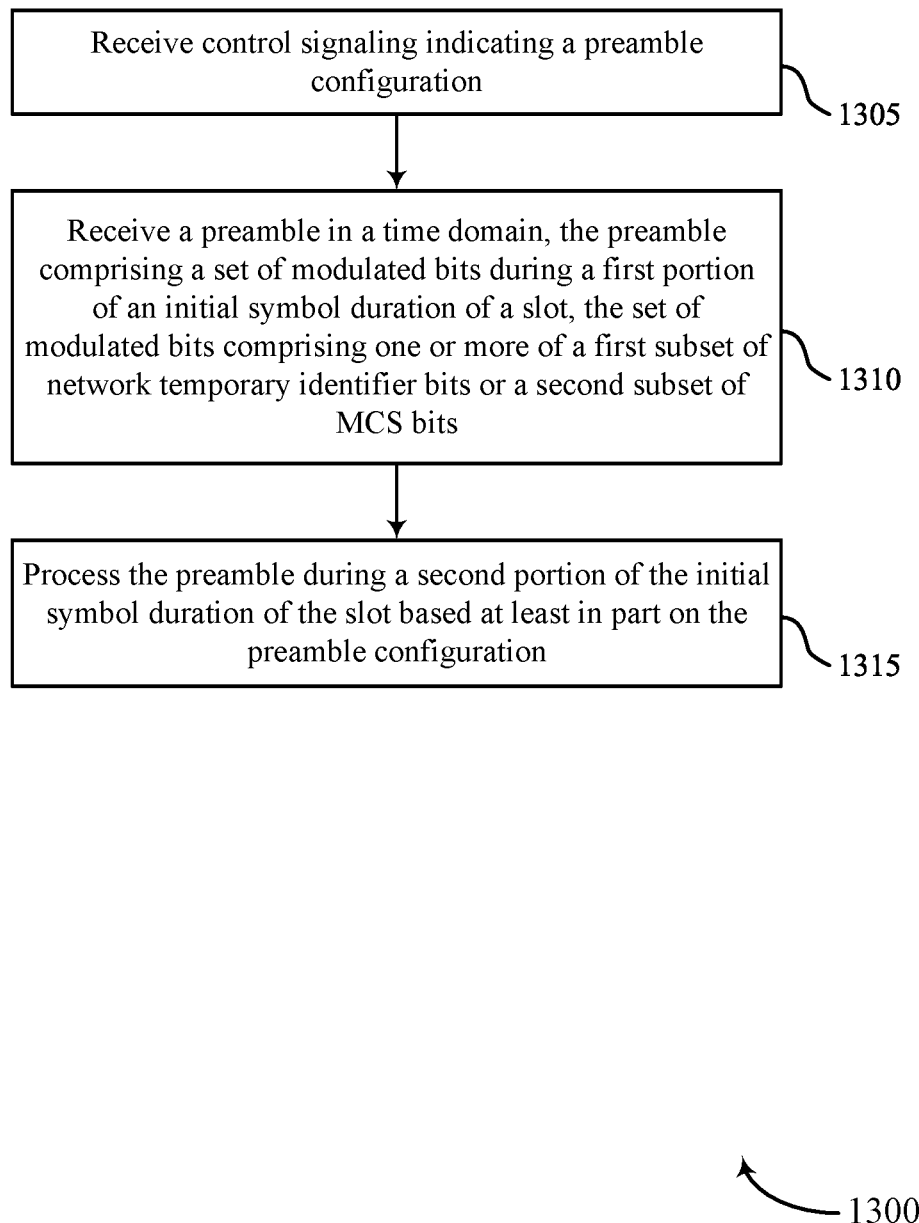
FIGS. 13 through 16 show flowcharts illustrating methods that support modulated preambles for low power operations in accordance with aspects of the present disclosure.

FIG. 13 shows a flowchart illustrating a method 1300 that supports modulated preambles for low power operations in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a preamble configuration. The operations of 1305 may be performed in accordance with examples as disclosed herein. In some examples, aspects of the operations of 1305 may be performed by a configuration component 725 as described with reference to FIG. 7.

At 1310, the method may include receiving a preamble in a time domain, the preamble including a set of modulated bits during a first portion of an initial symbol duration of a slot, the set of modulated bits including one or more of a first subset of network temporary identifier bits or a second subset of MCS bits. The operations of 1310 may be performed in accordance with examples as disclosed herein. In some examples, aspects of the operations of 1310 may be performed by a preamble component 730 as described with reference to FIG. 7.

At 1315, the method may include processing the preamble during a second portion of the initial symbol duration of the slot based on the preamble configuration. The operations of 1315 may be performed in accordance with examples as disclosed herein. In some examples, aspects of the operations of 1315 may be performed by a preamble component 730 as described with reference to FIG. 7.

Figure 14:
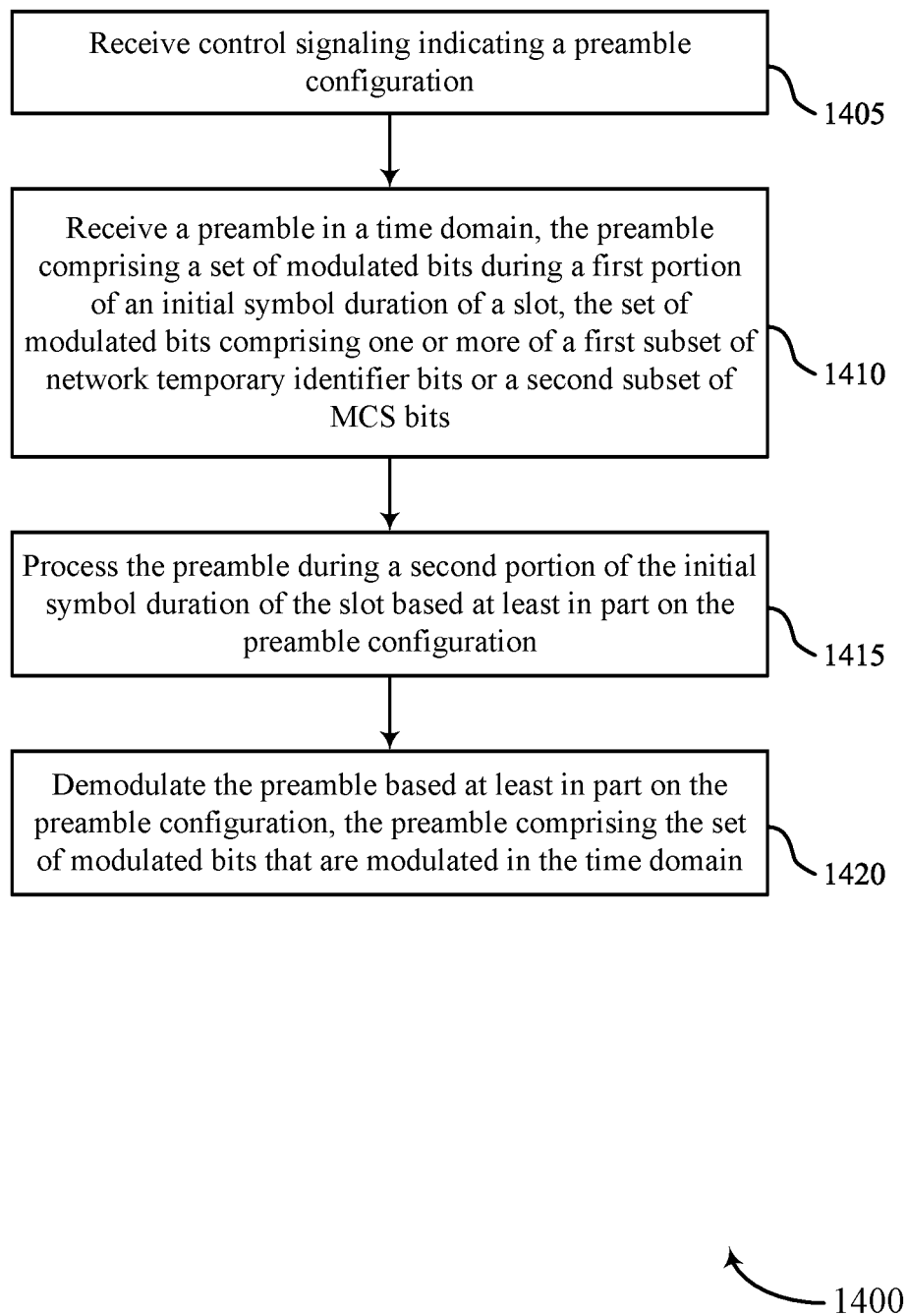

FIG. 14 shows a flowchart illustrating a method 1400 that supports modulated preambles for low power operations in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a preamble configuration. The operations of 1405 may be performed in accordance with examples as disclosed herein. In some examples, aspects of the operations of 1405 may be performed by a configuration component 725 as described with reference to FIG. 7.

At 1410, the method may include receiving a preamble in a time domain, the preamble including a set of modulated bits during a first portion of an initial symbol duration of a slot, the set of modulated bits including one or more of a first subset of network temporary identifier bits or a second subset of MCS bits. The operations of 1410 may be performed in accordance with examples as disclosed herein. In some examples, aspects of the operations of 1410 may be performed by a preamble component 730 as described with reference to FIG. 7.

At 1415, the method may include processing the preamble during a second portion of the initial symbol duration of the slot based on the preamble configuration. The operations of 1415 may be performed in accordance with examples as disclosed herein. In some examples, aspects of the operations of 1415 may be performed by a preamble component 730 as described with reference to FIG. 7.

At 1420, the method may include demodulating the preamble based on the preamble configuration, the preamble including the set of modulated bits that are modulated in the time domain. The operations of 1420 may be performed in accordance with examples as disclosed herein. In some examples, aspects of the operations of 1420 may be performed by a demodulator component 735 as described with reference to FIG. 7.

Figure 15:
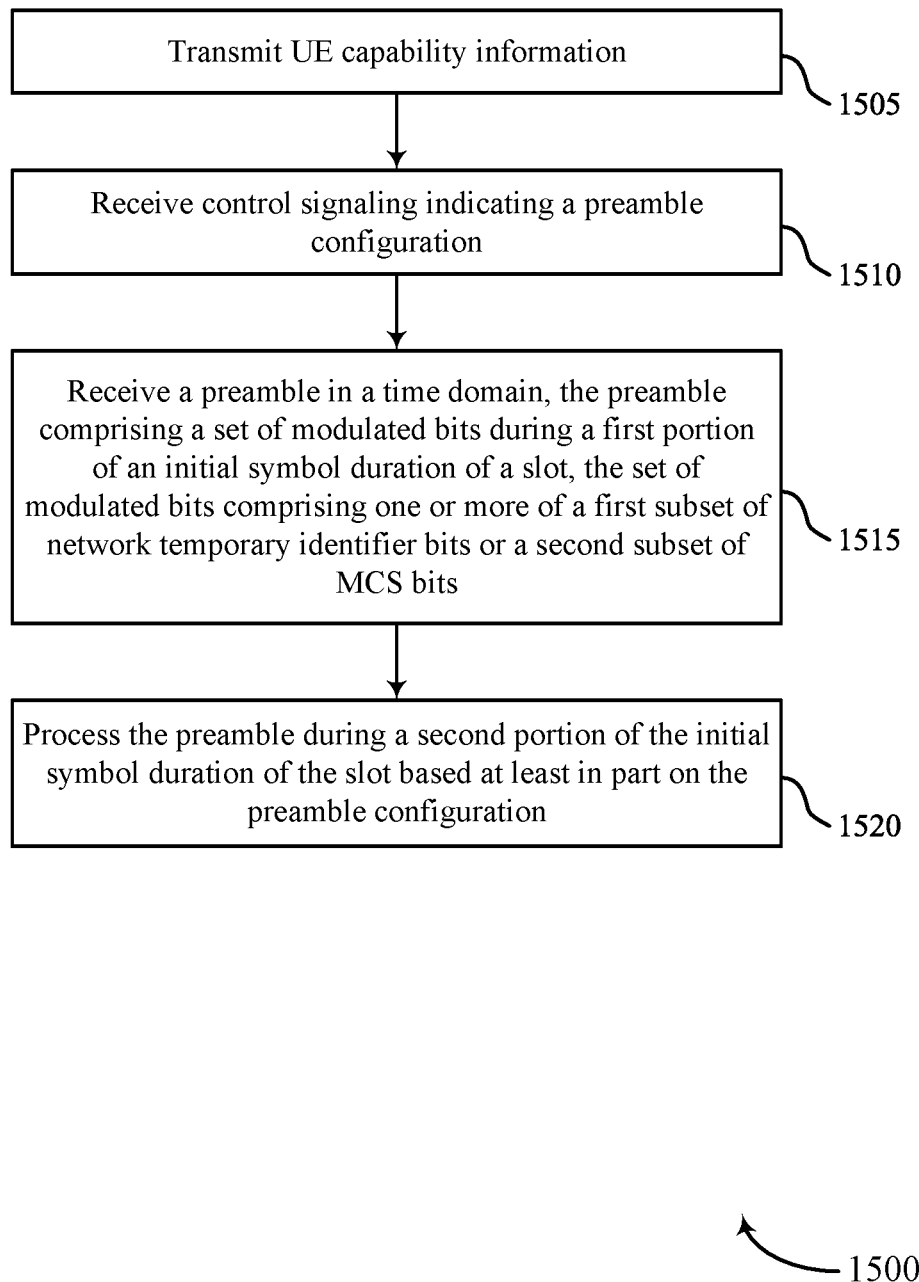

FIG. 15 shows a flowchart illustrating a method 1500 that supports modulated preambles for low power operations in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting UE capability information.

The operations of 1505 may be performed in accordance with examples as disclosed herein. In some examples, aspects of the operations of 1505 may be performed by a capability component 750 as described with reference to FIG. 7.

At 1510, the method may include receiving control signaling indicating a preamble configuration. In some examples, receiving the control signaling indicating the preamble configuration may be based on the UE capability information. The operations of 1510 may be performed in accordance with examples as disclosed herein.

In some examples, aspects of the operations of 1510 may be performed by a configuration component 725 as described with reference to FIG. 7.

At 1515, the method may include receiving a preamble in a time domain, the preamble including a set of modulated bits during a first portion of an initial symbol duration of a slot, the set of modulated bits including one or more of a first subset of network temporary identifier bits or a second subset of MCS bits. The operations of 1515 may be performed in accordance with examples as disclosed herein. In some examples, aspects of the operations of 1515 may be performed by a preamble component 730 as described with reference to FIG. 7.

At 1520, the method may include processing the preamble during a second portion of the initial symbol duration of the slot based on the preamble configuration. The operations of 1520 may be performed in accordance with examples as disclosed herein. In some examples, aspects of the operations of 1520 may be performed by a preamble component 730 as described with reference to FIG. 7.

Figure 16:
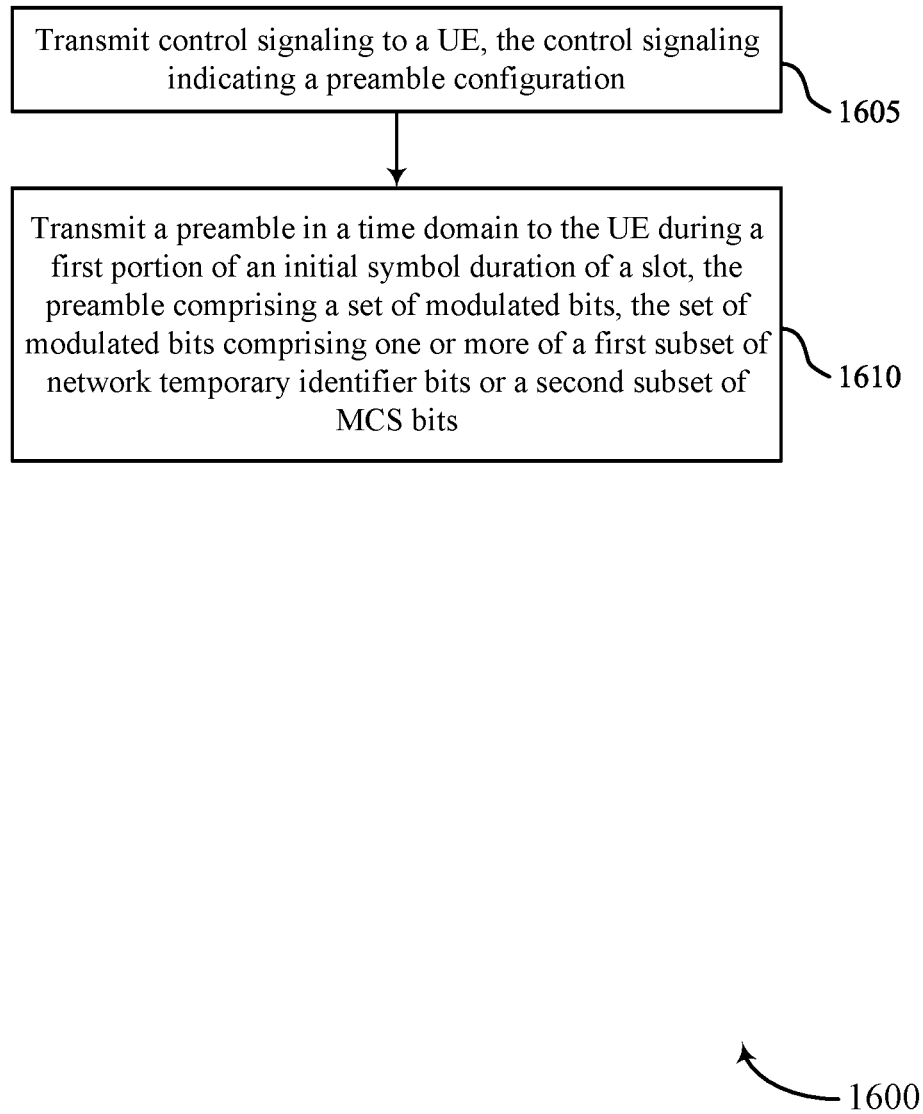

FIG. 16 shows a flowchart illustrating a method 1600 that supports modulated preambles for low power operations in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting control signaling to a UE, the control signaling indicating a preamble configuration. The operations of 1605 may be performed in accordance with examples as disclosed herein. In some examples, aspects of the operations of 1605 may be performed by a configuration component 1125 as described with reference to FIG. 11.

At 1610, the method may include transmitting a preamble in a time domain to the UE during a first portion of an initial symbol duration of a slot, the preamble including a set of modulated bits, the set of modulated bits including one or more of a first subset of network temporary identifier bits or a second subset of MCS bits. The operations of 1610 may be performed in accordance with examples as disclosed herein. In some examples, aspects of the operations of 1610 may be performed by a preamble component 1130 as described with reference to FIG. 11.

The following provides an overview of aspects of the present disclosure:

Aspect 1: A method for wireless communication at a UE, comprising: receiving control signaling indicating a preamble configuration; receiving a preamble in a time domain, the preamble comprising a set of modulated bits during a first portion of an initial symbol duration of a slot, the set of modulated bits comprising one or more of a first subset of network temporary identifier bits or a second subset of MCS bits; and processing the preamble during a second portion of the initial symbol duration of the slot based at least in part on the preamble configuration.

Aspect 2: The method of aspect 1, wherein processing the preamble comprises: demodulating the preamble based at least in part on the preamble configuration, the preamble comprising the set of modulated bits that are modulated in the time domain.

Aspect 3: The method of any of aspects 1 through 2, further comprising: determining a set of candidate preambles associated with the UE based at least in part on the preamble configuration; and determining a presence of an association between the preamble and a candidate preamble of the set of candidate preambles associated with the UE based at least in part on comparing the preamble to the set of candidate preambles associated with the UE, wherein processing the preamble is based at least in part on the determining of the presence of the association between the preamble and the candidate preamble of the set of candidate preambles associated with the UE.

Aspect 4: The method of aspect 3, further comprising: determining a SNR associated with the preamble based at least in part on the determining of the presence of the association between the preamble and the candidate preamble of the set of candidate preambles associated with the UE, wherein processing the preamble is based at least in part on the determining of the SNR associated with the preamble.

Aspect 5: The method of aspect 4, further comprising: comparing the SNR associated with the preamble to a SNR threshold for a MCS associated with the second subset of MCS bits, wherein processing the preamble is based at least in part on the comparing of the SNR associated with the preamble to the SNR threshold for the MCS associated with the second subset of MCS bits.

Aspect 6: The method of aspect 5, further comprising: selecting the MCS from a set of MCS s based at least in part on a network temporary identifier associated with the UE and a second network temporary identifier associated with a second UE, wherein comparing the SNR associated with the preamble to the SNR threshold for the MCS associated with the second subset of MCS bits is based at least in part on the selecting.

Aspect 7: The method of any of aspects 5 through 6, further comprising: setting a resolution for a radio frequency circuit associated with the UE based at least in part on one or more of the SNR or the MCS, and the comparing of the SNR associated with the preamble to the SNR threshold for the MCS associated with the second subset of MCS bits; and performing wireless communication based at least in part on setting the resolution for the radio frequency circuit associated with the UE.

Aspect 8: The method of any of aspects 5 through 7, further comprising: refraining from decoding a downlink message associated with the preamble based at least in part on the comparing of the SNR associated with the preamble to the SNR threshold for the MCS associated with the second subset of MCS bits; and transmitting a negative acknowledgment based at least in part on the refraining from decoding the downlink message associated with the preamble.

Aspect 9: The method of any of aspects 1 through 8, further comprising: determining a set of candidate preambles associated with the UE based at least in part on the preamble configuration; and determining an absence of an association between the preamble and a candidate preamble of the set of candidate preambles associated with the UE based at least in part on comparing the preamble to the set of candidate preambles associated with the UE, wherein processing the preamble is based at least in part on the determining of the absence of the association between the preamble and the candidate preamble of the set of candidate preambles associated with the UE.

Aspect 10: The method of aspect 9, wherein processing the preamble comprises: refraining from decoding a downlink message associated with the preamble based at least in part on the determining of the absence of the association between the preamble and the candidate preamble of the set of candidate preambles associated with the UE.

Aspect 11: The method of any of aspects 9 through 10, further comprising: operating in a discontinuous reception mode until a subsequent slot based at least in part on the determining of the absence of the association between the preamble and the candidate preamble of the set of candidate preambles associated with the UE.

Aspect 12: The method of any of aspects 1 through 11, further comprising: receiving a downlink transmission during a symbol duration after the initial symbol duration of the slot based at least in part on processing the preamble, wherein the downlink transmission comprises one or more of a PDCCH transmission or a PDSCH transmission.

Aspect 13: The method of aspect 12, further comprising: setting a resolution for an ADC based at least in part on the processing of the preamble, wherein receiving the downlink transmission during the symbol duration is based at least in part on the setting of the resolution for the ADC.

Aspect 14: The method of aspect 13, wherein the set of modulated bits comprises one or more of a third subset of constellation bits associated with the downlink transmission or a fourth subset of ADC associated with the resolution for the ADC.

Aspect 15: The method of any of aspects 1 through 14, further comprising: transmitting UE capability information, wherein receiving the control signaling indicating the preamble configuration is based at least in part on the UE capability information.

Aspect 16: The method of any of aspects 1 through 15, wherein the preamble comprises an orthogonal preamble sequence.

Aspect 17: The method of aspect 16, wherein the orthogonal preamble sequence comprise a Zadoff-Chu sequence.

Aspect 18: The method of any of aspects 1 through 17, wherein the first portion of the initial symbol duration is greater than or less than the second portion of the initial symbol duration.

Aspect 19: The method of any of aspects 1 through 18, wherein the initial symbol duration comprises an OFDM symbol.

Aspect 20: A method for wireless communications at a base station, comprising: transmitting control signaling to a UE, the control signaling indicating a preamble configuration; and transmitting a preamble in a time domain to the UE during a first portion of an initial symbol duration of a slot, the preamble comprising a set of modulated bits, the set of modulated bits comprising one or more of a first subset of network temporary identifier bits or a second subset of MCS bits.

Aspect 21: The method of aspect 20, wherein the first subset of network temporary identifier bits comprises at least a portion of a network temporary identifier corresponding to the UE.

Aspect 22: The method of any of aspects 20 through 21, further comprising: transmitting a downlink transmission to the UE during a symbol duration after the initial symbol duration of the slot, the downlink transmission comprising one or more of a PDCCH transmission or a PDSCH transmission.

Aspect 23: The method of aspect 22, wherein the second subset of MCS bits comprises an indication of the downlink transmission.

Aspect 24: The method of any of aspects 22 through 23, further comprising: modulating the preamble based at least in part on a first MCS, the second subset of MCS bits comprising an indication of the first MCS.

Aspect 25: The method of any of aspects 22 through 24, wherein the preamble is associated with a first subcarrier spacing and the downlink transmission is associated with a second subcarrier spacing different from the first subcarrier spacing.

Aspect 26: The method of any of aspects 20 through 25, further comprising: receiving UE capability information from the UE, wherein transmitting the control signaling to the UE is based at least in part on the UE capability information.

Aspect 27: The method of any of aspects 20 through 26, further comprising: transmitting the preamble to a plurality of UEs, wherein a number of bits in the first subset of network temporary identifier bits is based at least in part on the plurality of UEs.

Aspect 28: The method of aspect 27, further comprising: generating the first subset of network temporary identifier bits based at least in part on multiplexing a plurality of network temporary identifiers corresponding to the plurality of UEs.

Aspect 29: An apparatus for wireless communication at a UE, comprising a processor; memory coupled with the processor; and instructions stored in the memory and executable by the processor to cause the apparatus to perform a method of any of aspects 1 through 19.

Aspect 30: An apparatus for wireless communication at a UE, comprising at least one means for performing a method of any of aspects 1 through 19.

Aspect 31: A computer program product comprising a non-transitory computer-readable medium for wireless communications at a UE, the non-transitory computer-readable medium comprising instructions executable by a processor to perform a method of any of aspects 1 through 19.

Aspect 32: An apparatus for wireless communications at a base station, comprising a processor; memory coupled with the processor; and instructions stored in the memory and executable by the processor to cause the apparatus to perform a method of any of aspects 20 through 28.

Aspect 33: An apparatus for wireless communications at a base station, comprising at least one means for performing a method of any of aspects 20 through 28.

Aspect 34: A computer program product comprising a non-transitory computer-readable medium for wireless communications at a base station, the non-transitory computer-readable medium comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a preamble configuration;
   receiving a preamble in a time domain, the preamble comprising a set of modulated bits during a first portion of an initial symbol duration of a slot, the set of modulated bits comprising one or more of a first subset of network temporary identifier bits or a second subset of modulation and coding scheme bits; and
   processing the preamble during a second portion of the initial symbol duration of the slot based at least in part on the preamble configuration.

2. The method of claim 1, wherein processing the preamble comprises:
   demodulating the preamble based at least in part on the preamble configuration, the preamble comprising the set of modulated bits that are modulated in the time domain.

3. The method of claim 1, further comprising:
   determining a set of candidate preambles associated with the UE based at least in part on the preamble configuration; and
   determining a presence of an association between the preamble and a candidate preamble of the set of candidate preambles associated with the UE based at least in part on comparing the preamble to the set of candidate preambles associated with the UE,
   wherein processing the preamble is based at least in part on the determining of the presence of the association between the preamble and the candidate preamble of the set of candidate preambles associated with the UE.

4. The method of claim 3, further comprising:
   determining a signal-to-noise ratio associated with the preamble based at least in part on the determining of the presence of the association between the preamble and the candidate preamble of the set of candidate preambles associated with the UE,
   wherein processing the preamble is based at least in part on the determining of the signal-to-noise ratio associated with the preamble.

5. The method of claim 4, further comprising:
   comparing the signal-to-noise ratio associated with the preamble to a signal-to-noise ratio threshold for a modulation and coding scheme associated with the second subset of modulation and coding scheme bits,
   wherein processing the preamble is based at least in part on the comparing of the signal-to-noise ratio associated with the preamble to the signal-to-noise ratio threshold for the modulation and coding scheme associated with the second subset of modulation and coding scheme bits.

6. The method of claim 5, further comprising:
   selecting the modulation and coding scheme from a set of modulation and coding schemes based at least in part on a network temporary identifier associated with the UE and a second network temporary identifier associated with a second UE,
   wherein comparing the signal-to-noise ratio associated with the preamble to the signal-to-noise ratio threshold for the modulation and coding scheme associated with the second subset of modulation and coding scheme bits is based at least in part on the selecting.

7. The method of claim 5, further comprising:
   setting a resolution for a radio frequency circuit associated with the UE based at least in part on one or more of the signal-to-noise ratio or the modulation and coding scheme, and the comparing of the signal-to-noise ratio associated with the preamble to the signal-to-noise ratio threshold for the modulation and coding scheme associated with the second subset of modulation and coding scheme bits; and
   performing wireless communication based at least in part on setting the resolution for the radio frequency circuit associated with the UE.

8. The method of claim 5, further comprising:
   refraining from decoding a downlink message associated with the preamble based at least in part on the comparing of the signal-to-noise ratio associated with the preamble to the signal-to-noise ratio threshold for the modulation and coding scheme associated with the second subset of modulation and coding scheme bits; and
   transmitting a negative acknowledgment based at least in part on the refraining from decoding the downlink message associated with the preamble.

9. The method of claim 1, further comprising:
   determining a set of candidate preambles associated with the UE based at least in part on the preamble configuration; and
   determining an absence of an association between the preamble and a candidate preamble of the set of candidate preambles associated with the UE based at least in part on comparing the preamble to the set of candidate preambles associated with the UE,
   wherein processing the preamble is based at least in part on the determining of the absence of the association between the preamble and the candidate preamble of the set of candidate preambles associated with the UE.

10. The method of claim 9, wherein processing the preamble comprises:
    refraining from decoding a downlink message associated with the preamble based at least in part on the determining of the absence of the association between the preamble and the candidate preamble of the set of candidate preambles associated with the UE.

11. The method of claim 9, further comprising:
    operating in a discontinuous reception mode until a subsequent slot based at least in part on the determining of the absence of the association between the preamble and the candidate preamble of the set of candidate preambles associated with the UE.

12. The method of claim 1, further comprising:
    receiving a downlink transmission during a symbol duration after the initial symbol duration of the slot based at least in part on processing the preamble,
    wherein the downlink transmission comprises one or more of a physical downlink control channel transmission or a physical downlink shared channel transmission.

13. The method of claim 12, further comprising:
    setting a resolution for an analog-to-digital converter based at least in part on the processing of the preamble,
    wherein receiving the downlink transmission during the symbol duration is based at least in part on the setting of the resolution for the analog-to-digital converter.

14. The method of claim 13, wherein the set of modulated bits comprises one or more of a third subset of constellation bits associated with the downlink transmission or a fourth subset of analog-to-digital converter bits associated with the resolution for the analog-to-digital converter.

15. The method of claim 1, further comprising:
transmitting UE capability information, wherein receiving the control signaling indicating the preamble configuration is based at least in part on the UE capability information.

16. The method of claim 1, wherein the preamble comprises an orthogonal preamble sequence.

17. The method of claim 16, wherein the orthogonal preamble sequence comprises a Zadoff-Chu sequence.

18. The method of claim 1, wherein the first portion of the initial symbol duration is greater than or less than the second portion of the initial symbol duration.

19. The method of claim 1, wherein the initial symbol duration comprises an orthogonal frequency division multiplexing symbol.

20. A method for wireless communications at a base station, comprising:
transmitting control signaling to a user equipment (UE), the control signaling indicating a preamble configuration; and
transmitting a preamble in a time domain to the UE during a first portion of an initial symbol duration of a slot, the preamble comprising a set of modulated bits, the set of modulated bits comprising one or more of a first subset of network temporary identifier bits or a second subset of modulation and coding scheme bits.

21. The method of claim 20, wherein the first subset of network temporary identifier bits comprises at least a portion of a network temporary identifier corresponding to the UE.

22. The method of claim 20, further comprising:
transmitting a downlink transmission to the UE during a symbol duration after the initial symbol duration of the slot, the downlink transmission comprising one or more of a physical downlink control channel transmission or a physical downlink shared channel transmission.

23. The method of claim 22, wherein the second subset of modulation and coding scheme bits comprises an indication of the downlink transmission.

24. The method of claim 22, further comprising:
modulating the preamble based at least in part on a first modulation and coding scheme, the second subset of modulation and coding scheme bits comprising an indication of the first modulation and coding scheme.

25. The method of claim 22, wherein the preamble is associated with a first subcarrier spacing and the downlink transmission is associated with a second subcarrier spacing different from the first subcarrier spacing.

26. The method of claim 20, further comprising:
receiving UE capability information from the UE, wherein transmitting the control signaling to the UE is based at least in part on the UE capability information.

27. The method of claim 20, further comprising:
transmitting the preamble to a plurality of UEs, wherein a number of bits in the first subset of network temporary identifier bits is based at least in part on the plurality of UEs.

28. The method of claim 27, further comprising:
generating the first subset of network temporary identifier bits based at least in part on multiplexing a plurality of network temporary identifiers corresponding to the plurality of UEs.

29. An apparatus for wireless communication, comprising:
a processor;
memory coupled with the processor; and
instructions stored in the memory and executable by the processor to cause the apparatus to:
receive control signaling indicating a preamble configuration;
receive a preamble in a time domain, the preamble comprising a set of modulated bits during a first portion of an initial symbol duration of a slot, the set of modulated bits comprising one or more of a first subset of network temporary identifier bits or a second subset of modulation and coding scheme bits; and
process the preamble during a second portion of the initial symbol duration of the slot based at least in part on the preamble configuration.

30. An apparatus for wireless communications, comprising:
a processor;
memory coupled with the processor; and
instructions stored in the memory and executable by the processor to cause the apparatus to:
transmit control signaling to a user equipment (UE), the control signaling indicating a preamble configuration; and
transmit a preamble in a time domain to the UE during a first portion of an initial symbol duration of a slot, the preamble comprising a set of modulated bits, the set of modulated bits comprising one or more of a first subset of network temporary identifier bits or a second subset of modulation and coding scheme bits.

* * * * *